US 11,940,342 B2

(12) United States Patent
    Ausserlechner

(10) Patent No.: US 11,940,342 B2
(45) Date of Patent: Mar. 26, 2024

(54) INDUCTIVE TORQUE SENSOR FOR ROTATING SHAFTS

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 150 days.

(21) Appl. No.: 16/996,073

(22) Filed: Aug. 18, 2020

(65) Prior Publication Data

US 2022/0057281 A1    Feb. 24, 2022

(51) Int. Cl.
    *G01L 3/10*     (2006.01)
    *G01B 7/30*     (2006.01)
    (Continued)

(52) U.S. Cl.
    CPC ............ *G01L 3/105* (2013.01); *G01B 7/30* (2013.01); *G01D 5/20* (2013.01); *G01D 5/2006* (2013.01);
    (Continued)

(58) Field of Classification Search
    CPC ......... G01L 3/105; G01L 3/02; G01L 5/0042; G01L 5/26; G01B 7/30; G01D 5/2006; G01D 5/2053; G01D 5/20
    See application file for complete search history.

(56) References Cited

U.S. PATENT DOCUMENTS 6,236,199 B1 *  5/2001  Irle ..................... G01D 5/2093
                                               324/207.17
6,384,598 B1    5/2002  Hobein et al.
(Continued)

FOREIGN PATENT DOCUMENTS

CN    105209850 A    12/2015
CN    107407692 A    11/2017
(Continued)

OTHER PUBLICATIONS

Ye, Lin et al. "Nonlinearity analysis and parameters optimization for an inductive angle sensor." Sensors (Basel, Switzerland) vol. 14,3 4111-25. Feb. 28, 2014, doi:10.3390/s140304111.
Lin Ye, Ming Yang, et al., "Nonlinearity Analysis and Parameters Optimization for an Inductive Angle Sensor", Sensors 2014, 14, 4111-4125; doi:10.3390/s140304111; www.mdpi.com/journal/sensors.
Aug. 3, 2023 (CN) Office Action—App. 202110941741X.

*Primary Examiner* — Eman A Alkafawi
*Assistant Examiner* — Joseph O Nyamogo
(74) *Attorney, Agent, or Firm* — Banner & Witcoff Ltd.

(57) ABSTRACT

The described techniques are directed to inductive torque sensors that implement independent target coil and pickup coil systems. By utilizing the various principles of inductive angle sensors, and as a result of the specific physical arrangement of target coils, the inductive torque sensor may independently obtain a rotational position (i.e., mechanical angle) of the rotatable input shaft via one pickup coil system, and a rotational position (i.e., mechanical angle) of the rotatable output shaft via another pickup coil system. Combiner circuitry is also provided to calculate the torsion angle using the signals induced in each of two separate pickup coil systems. By using different k-fold symmetry periodicities in the target coils with respect to the coil configurations, the inductive torque sensor advantageously reduces or eliminates mutual coupling between the different target coil systems and provide robustness to stray or external electromagnetic fields.

24 Claims, 18 Drawing Sheets

(51) Int. Cl.
*G01D 5/20* (2006.01)
*G01L 5/00* (2006.01)
*G01L 5/26* (2006.01)

(52) U.S. Cl.
CPC .......... *G01D 5/2053* (2013.01); *G01L 5/0042* (2013.01); *G01L 5/26* (2013.01)

(56) References Cited

U.S. PATENT DOCUMENTS

| | | |
|---|---|---|
| 9,230,592 B1 | 1/2016 | Yong et al. |
| 2005/0028613 A1* | 2/2005 | Onoda ..................... B62D 6/10 73/862.331 |
| 2015/0102041 A1 | 4/2015 | Lee |
| 2017/0160101 A1 | 6/2017 | Frese |
| 2017/0166251 A1* | 6/2017 | Shao ........................ G01L 3/105 |
| 2018/0224301 A1* | 8/2018 | Herrmann ............... G01D 5/204 |
| 2019/0063956 A1* | 2/2019 | Bertin .................... G01D 5/208 |
| 2019/0310148 A1* | 10/2019 | Bertin .................... G01L 5/221 |
| 2019/0331541 A1* | 10/2019 | Janisch ................ G01D 5/2053 |

FOREIGN PATENT DOCUMENTS

| | | |
|---|---|---|
| CN | 109990697 A | 7/2019 |
| CN | 110914644 A | 3/2020 |
| JP | H07116048 A | 5/1995 |
| JP | 2010190704 A | 9/2010 |

\* cited by examiner

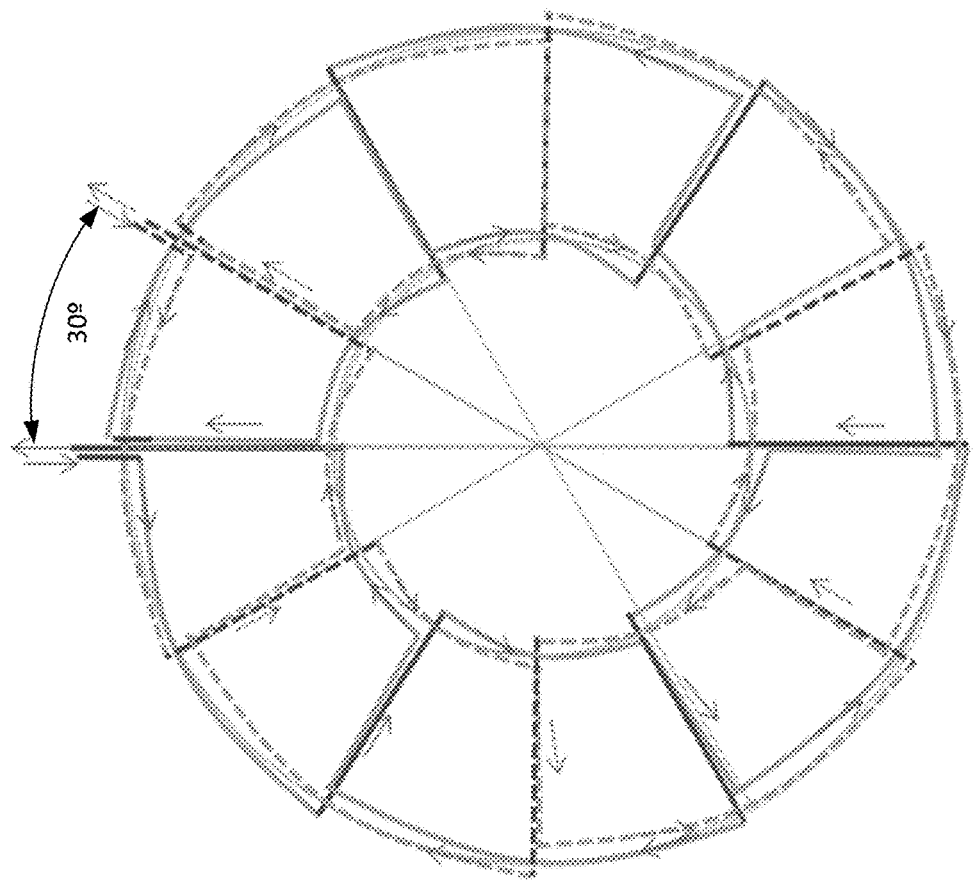
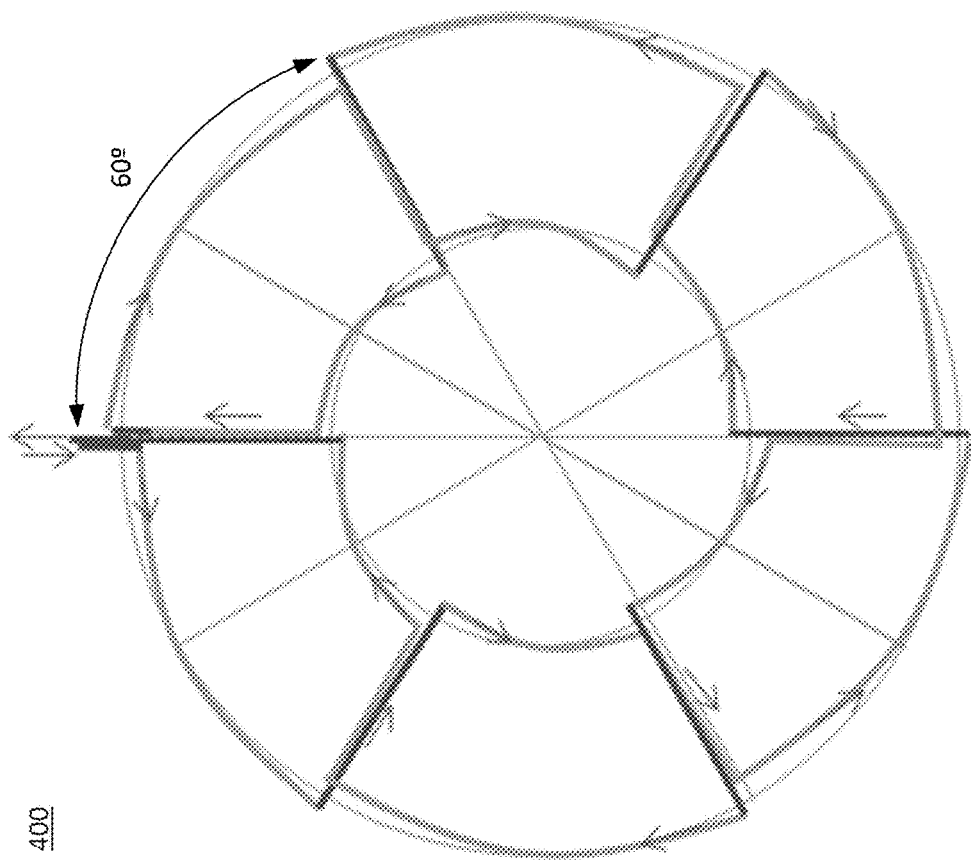
FIG. 4A
FIG. 4B

1300

| m1 | m2 | m1*360/k1-m2*360/k2 |
|---|---|---|
| 0 | 6 | -360 |
| 0 | 5 | -300 |
| 1 | 6 | -288 |
| 0 | 4 | -240 |
| 1 | 5 | -228 |
| 2 | 6 | -216 |
| 0 | 3 | -180 |
| 1 | 4 | -168 |
| 2 | 5 | -156 |
| 3 | 6 | -144 |
| 0 | 2 | -120 |
| 1 | 3 | -108 |
| 2 | 4 | -96 |
| 3 | 5 | -84 |
| 4 | 6 | -72 |
| 0 | 1 | -60 |
| 1 | 2 | -48 |
| 2 | 3 | -36 |
| 3 | 4 | -24 |
| 4 | 5 | -12 |
| 0 | 0 | 0 |
| 1 | 1 | 12 |
| 2 | 2 | 24 |
| 3 | 3 | 36 |
| 4 | 4 | 48 |
| 1 | 0 | 72 |
| 2 | 1 | 84 |
| 3 | 2 | 96 |
| 4 | 3 | 108 |
| 2 | 0 | 144 |
| 3 | 1 | 156 |
| 4 | 2 | 168 |
| 3 | 0 | 216 |
| 4 | 1 | 228 |
| 4 | 0 | 288 |

FIG. 13

INDUCTIVE TORQUE SENSOR FOR ROTATING SHAFTS

TECHNICAL FIELD

Aspects described herein generally relate to torque sensors and, more particularly, to torque sensors that implement inductive angle sensors.

BACKGROUND

For certain applications it is useful to measure the transmitted torque associated with a rotatable shaft. Torque sensors, which are transducers that convert a torsional mechanical input into an electrical output signal, may be conventionally used for this purpose. Such conventional torque sensors are costly, however, and may suffer from a lack of robustness to electromagnetic disturbances. Therefore, current torque sensors are inadequate.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

FIG. 4A illustrates an example winding of one of the receiving coils as shown in FIG. 1.

FIG. 4B illustrates an example of the receiving coils as shown in FIG. 1 rotated with respect to one another to cause a phase offset between their induced voltage signals after amplitude demodulation from a carrier frequency.

FIG. 13 illustrates an example lookup table (LUT) content to calculate the torsion angle, in accordance with one or more embodiments of the disclosure.

The example aspects of the present disclosure will be described with reference to the accompanying drawings. The drawing in which an element first appears is typically indicated by the leftmost digit(s) in the corresponding reference number.

SUMMARY

Figure 1:
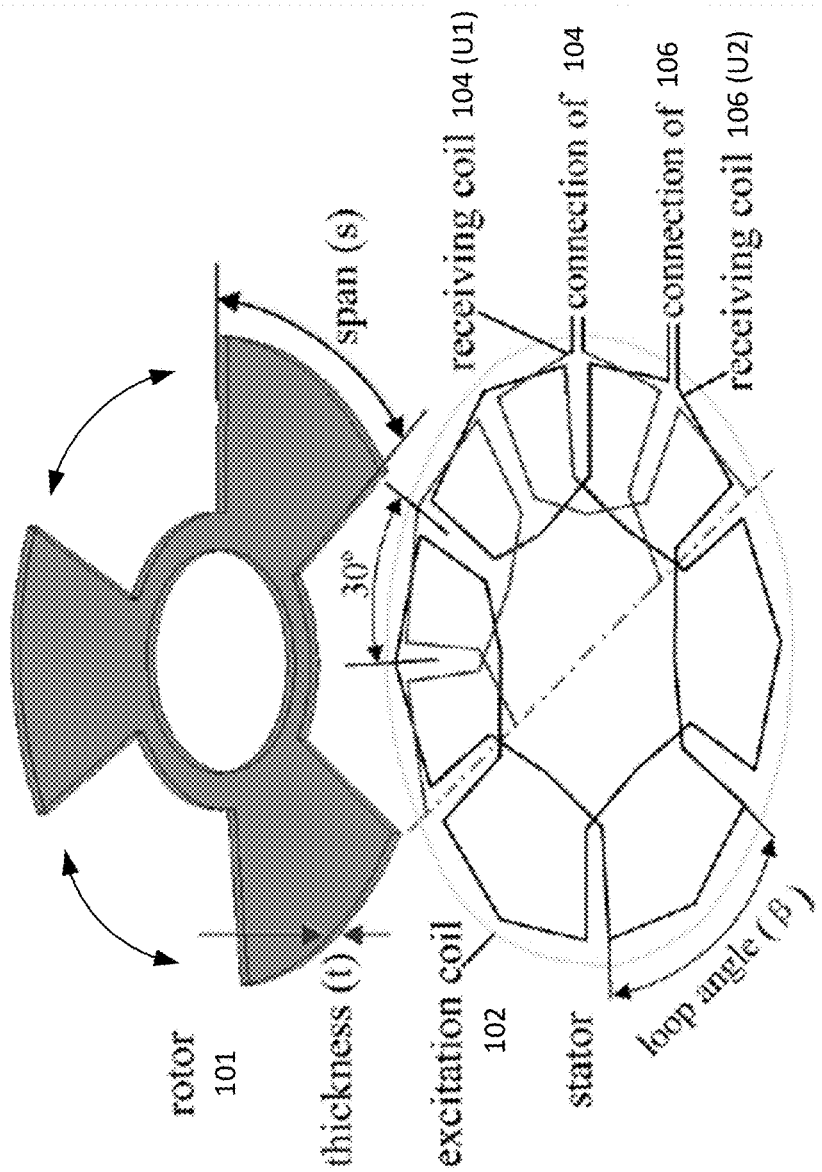
FIG. 1 illustrates an example of a conventional inductive angle sensor architecture.

Again, conventional torque sensors may be costly and suffer from a lack of robustness to electromagnetic fields. Thus, the embodiments described herein address these issues by leveraging the use of inductive angle sensors to measure a torque angle between rotating shafts or any other suitable components that may result in the transmission of measureable torque. The embodiments described herein utilize the principles of inductive angle sensors to measure the torque transmitted through a rotatable input shaft that is used as part of an inductive angle sensor architecture. The inductive torque sensor embodiments described herein are low-cost, accurate, and robust, particularly with respect to electromagnetic disturbances.

The embodiments described herein implement a physical arrangement between a rotatable input shaft and a rotatable output shaft, which have a common central axis and are coupled to one another to form a torsion element. As a result of this coupling, the rotatable input shaft and the rotatable output shaft may twist against one another to form a torsion angle, thus indicating the transmission of torque. The torsion angle is a fraction of the overall 360 degree rotation of the rotatable input shaft (e.g. ±5 degrees), and indicates both a magnitude and direction of the transmitted torque that is proportional to this torsion angle value. Thus, target coils may be mounted coaxial to the common central axis of the rotatable input shaft and the rotatable output shaft, with one target coil being mounted to a portion of the rotatable input shaft and another target coil being mounted to the rotatable output shaft.

As further discussed below, the inductive torque sensor embodiments discussed herein may implement independent power coil, target coil, and pickup coil systems. By utilizing the various principles of inductive angle sensors, and as a result of the aforementioned arrangement of target coils, the inductive torque sensor embodiments described herein may independently obtain a rotational position (i.e., mechanical angle) of the rotatable input shaft via one pickup coil system, and a rotational position (i.e., mechanical angle) of the rotatable output shaft via another pickup coil system. Combiner circuitry is also provided to calculate the torsion angle using the signals induced into each of the separate pickup coil systems via each respective target coil. Moreover, by using different k-fold symmetry periodicities in the target coils with respect to the coil configurations, the torque sensor embodiments described herein may advantageously reduce or eliminate mutual coupling between the different target coil systems and provide robustness to stray or external electromagnetic fields.

DETAILED DESCRIPTION

In the following description, numerous specific details are set forth to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Introduction to the Concept of k-Fold Symmetry

The embodiments discussed herein often reference the concept of rotational symmetry. Therefore, a brief introduction of this concept is warranted before explaining the additional details of the various embodiments further below. Rotational symmetry is a property that is said to be present when a shape looks the same after some rotation by a partial turn around that shape's central or common axis. In other words, an object's degree of rotational symmetry is the number of distinct orientations in which it looks exactly the same for each rotation. A shape is said to have k-fold symmetry, or periodicity k, if the shape can be rotated (in two dimensions) around an axis by $$\frac{360 \cdot n}{k},$$

with n being an arbitrary integer such that it looks the same. For example, a regular pentagon geometric shape has a k-fold symmetry or periodicity of 5, as each rotation of the regular pentagon by 72 degrees does not change the regular pentagon when viewed from the same perspective.

Introduction to the Concept of Astatic Coils

The embodiments discussed herein also incorporate the use of astatic coils. Thus, an introduction to the term "astatic" is also prudent before providing further details regarding the operation of the embodiments. A wound coil, which is described herein as being two-dimensional as an example but not by way of limitation, is said to be "astatic" if no voltage is induced for changes in the homogenous magnetic flux inductively coupled to that coil. In other words, in the presence of a homogenous magnetic field provided by an example coil A that is inductively coupled to an example astatic coil B, no electromotive force is induced in the coil B in response to changes in the homogeneous field provided by the coil A. However, in general if the coil A provides an inhomogeneous magnetic flux and subsequently changes, then a voltage would typically be induced in the coil B.

Inductive Angle Sensor Systems

FIG. 1 illustrates an example of a conventional inductive angle sensor architecture. As shown in FIG. 1, the stator portion includes three coils: an excitation coil 102 (also referred to as a "transmitter," "power," or "drive" coil), and two receiving coils 104, 106 (also referred to as "pickup" coils) which form part of an overall pickup coil system. The rotor portion, which freely rotates with respect to the stator portion, is made of a conductive material (e.g. aluminum) and has a three-fold symmetry or periodicity in this example.

To determine the rotational position (i.e. angle) of the rotor 101, the excitation coil 102 is typically supplied with a sinusoidal voltage on the order of 1 V at a frequency on the order of a few MegaHertz (e.g. 4 MHz). This generates an AC magnetic field (the primary magnetic field) on the target (the conductive rotor 101), which in turn causes eddy currents to flow at the rotor 101. These eddy currents result in the generation of another magnetic field (a secondary magnetic field), which is inductively coupled to the receiving coils 104, 106, causing an induced voltage at each of the receiving coils 104, 106. These induced voltages may be measured via the connection points as shown in FIG. 1, and are amplitude modulated signals. That is, the voltages induced at each of the receiving coils 104, 106 have a carrier frequency of the driving sinusoidal voltage (e.g. 4 MHz), but their amplitude depends on the rotational position of the rotor 101.

Figure 2:
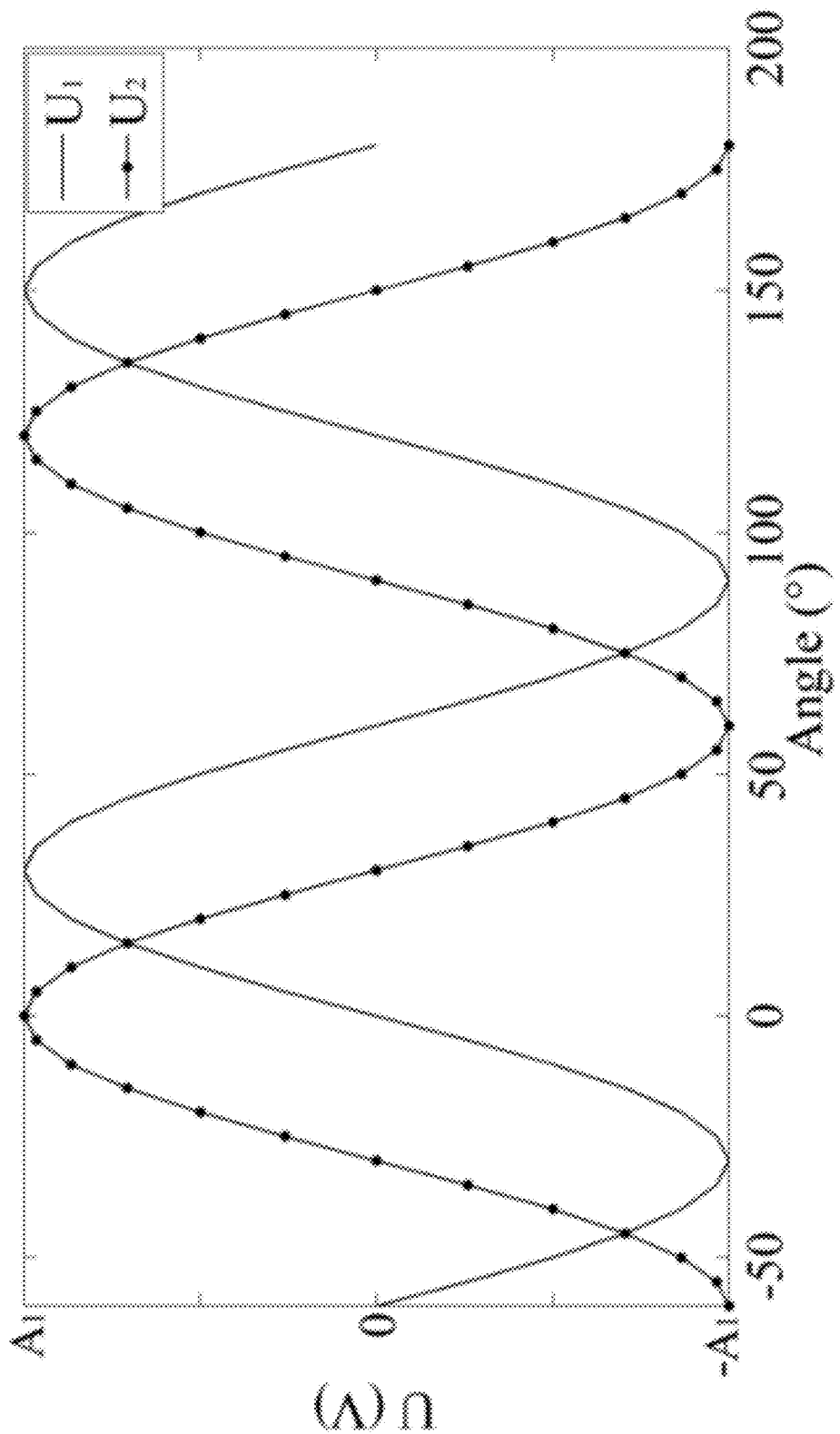
FIG. 2 illustrates an example of envelopes of amplitude modulated voltages induced in the two receiving coils as shown in FIG. 1 for varying rotational angles of the rotor after demodulation from a carrier frequency.
Figure 3:
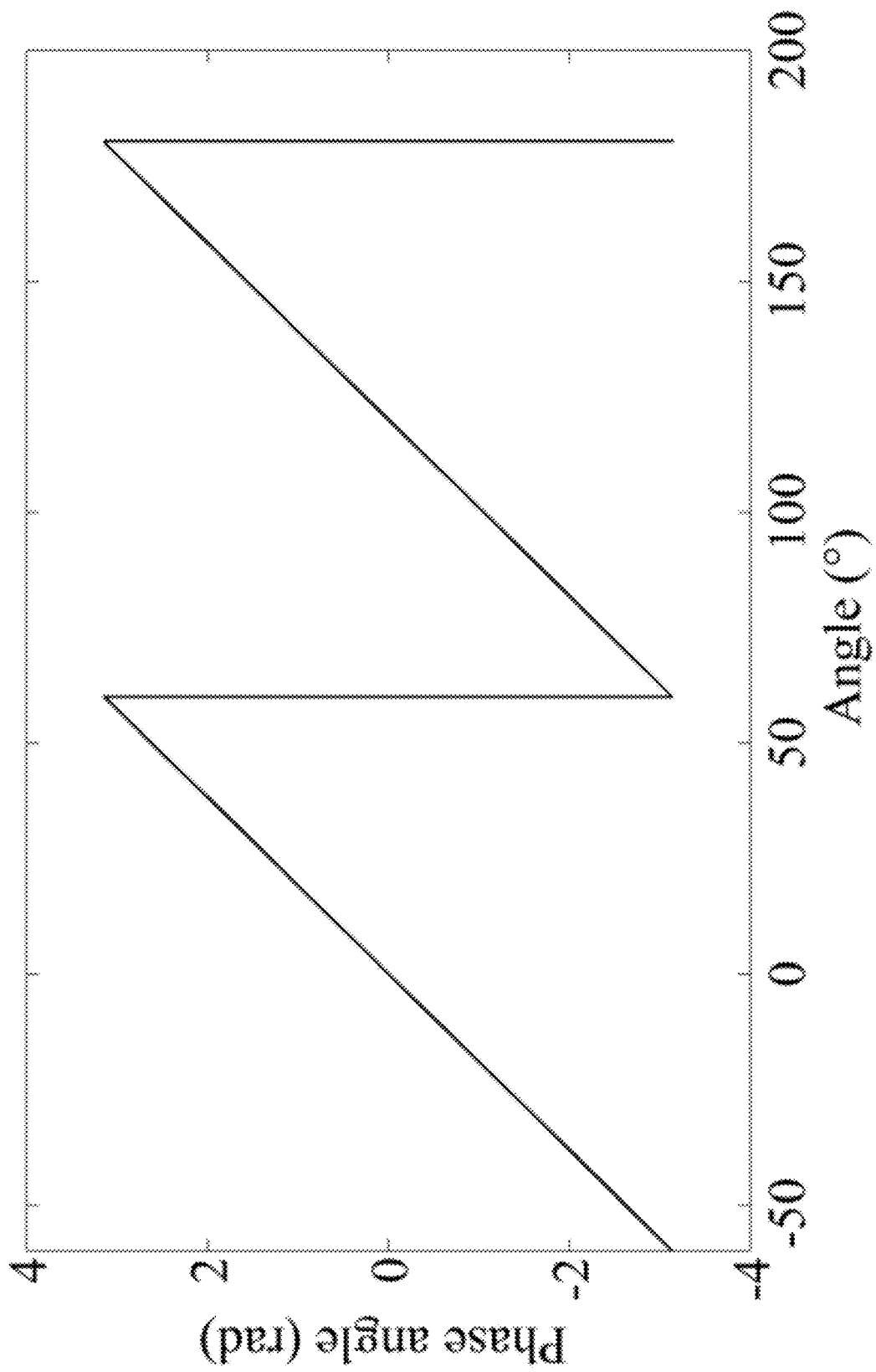
FIG. 3 illustrates an example of linear phase angle changes versus angle displacement voltages in the two receiving coils as shown in FIG. 1 for varying rotational angles of the rotor.

Envelopes of the induced signals provided at the connection terminals of the receiving coils 104, 106 may then be extracted with a phase-synchronous demodulator, and related to the rotational position of the rotor 101. An example of the envelopes, which represent the variation of the induced voltages on each of the receiving coils 104, 106 as a function of the angle of the rotating rotor 101, are shown in FIG. 2. In other words, the voltage signals U1, U2 as shown in FIG. 2 represent signals after demodulation from the carrier frequency, so the voltages U1, U2 are the envelopes of an amplitude modulated voltage, which is induced in the receiving coils 104, 106. To determine the rotational position of the rotor 101, at least two receiving coils are required. The rotational position may then be computed via the arctan function from both envelopes, which are phase shifted according to the relative positions of the coils with respect to one another. The result of extracting the phase information from the two receiving coils 104, 106 provides the phase angle as a function of the angle of the rotor 101 as shown in FIG. 3.

The receiving coils 104, 106 (also referred to herein as U1 and U2, respectively) are matched to the rotor 101, with each having 3-fold symmetry or periodicity in this example. The receiving coils 104, 106 may each include a number of windings in which every other loop is wound in a different direction. Using the receiving coil 104 as an example, the receiving coil 104 includes a total of six interspaced windings, each spanning 60 degrees. Thus, each individual winding may induce a current flow in a direction that is opposite to an adjacent winding. An example of the architecture of one of the receiving coils 104, 106 is shown in greater detail in FIG. 4A, in which the direction of each adjacent winding is shown by the accompanying arrows. The other receiving coil 106 is constructed in a similar manner as the receiving coil 104. This orientation of the receiving coils 104, 106 cancels out homogeneous external disturbances and symmetric disturbances from the excitation coil. Thus, the receiving coils 104, 106 function as astatic coils because they cancel out homogeneous magnetic fields. It is noted that although the receiving coils 104, 106 have six windings each, the k-fold periodicity of each coil is actually k=3 because of the astatic nature of the receiving coils 104, 106. That is, each of the receiving coils 104, 106 would need to be rotated 120 degrees to ensure that the coil is identical from the same perspective, as a rotation of 60 degrees would present the receiving coils 104, 106 with a winding in the opposite direction.

The receiving coils 104, 106 thus form a two-phase pickup coil system, with one phase per receiving coil. The receiving coils 104, 106 are offset from one another in a circumferential direction such the receiving coils are rotated with respect to one another by an amount proportional to the periodicity of the rotational symmetry. More specifically, the receiving coils are rotated with respect to one another by $$\frac{1}{2N}\left(\frac{360°}{k}\right),$$

where N is the number of receiving coils and k is the k-fold symmetry In the example shown in FIG. 4B, the coils are rotated with respect to one another by one quarter of the periodicity of the rotational symmetry, or 30 degrees. This results in the induced signals of each respective receiving coil 104, 106 being phase-shifted from one another by 90 degrees. As a result of this relationship, the receiving coil 104 may be referred to as a cosine coil, and the receiving coil 106 may be referred to as a sine coil.

Figure 5:
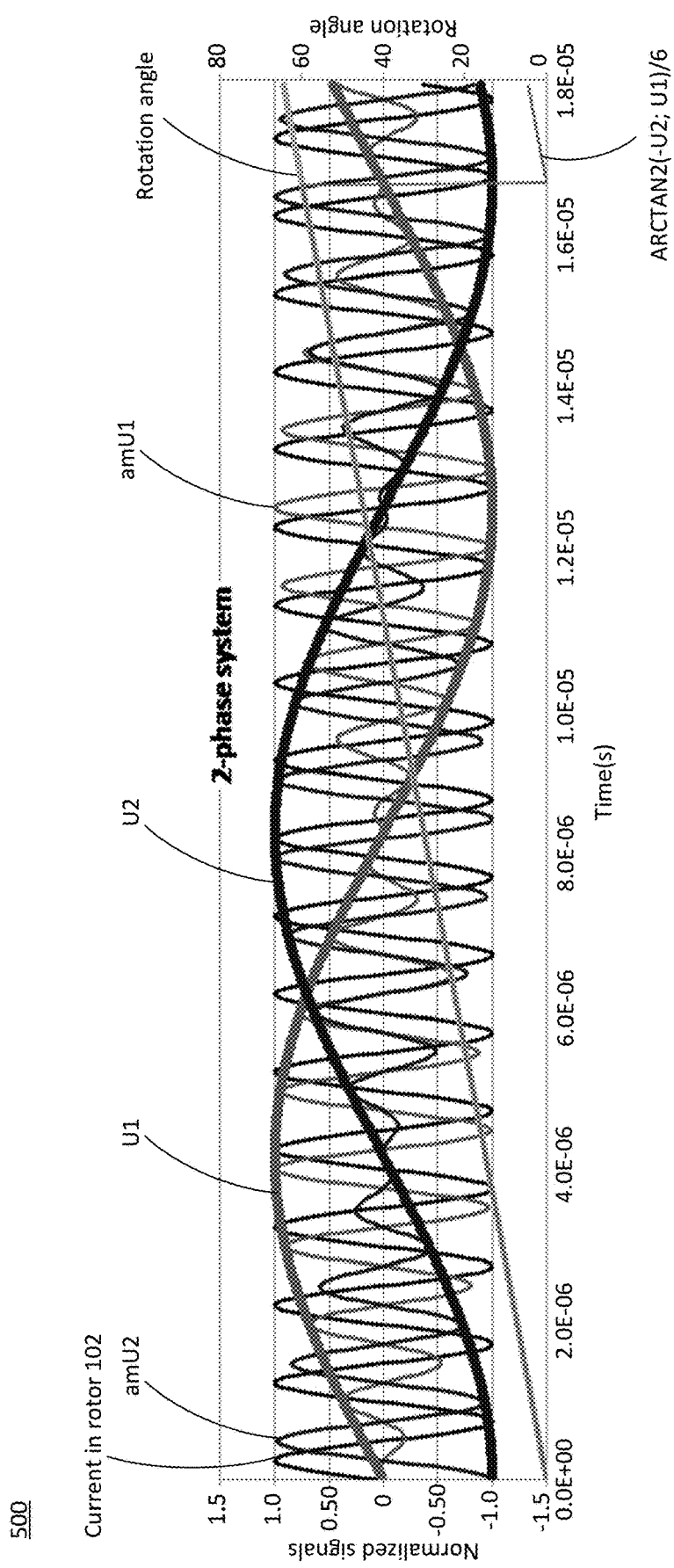
FIG. 5 illustrates an example of the generation of various signals associated with the two-phase conventional inductive angle sensor architecture of FIG. 1 over time.

An example of the various signals associated with the two-phase receiving coil such as the one shown in FIG. 1, which comprises the two receiving coils 104, 106, is shown in FIG. 5. The graph in FIG. 5 indicated time on the x-axis from 0 to 18 μs. The current in the rotor 101 is shown and represents the induced eddy current as a result of excitation via the excitation coil 102. The current signal associated with the rotor 101 oscillates at the same frequency as the oscillation signal used by the excitation coil 102 (1 MHz in this example) and has a constant amplitude and zero mean. The rotor 101 is assumed to be rotated with a speed of 360°/100 μs, which is a very high speed of 6*10^5 rpm (for the sake of visibility of signals in the plot). The signals amU1 and amU2 correspond to the amplitude of the voltages induced in the two respective receiving coils 104, 106, which again are identical and have 3-fold symmetry (like the rotor 101) but are rotated with respect to one another by 30 degrees. Thus, as shown in FIG. 5, the amplitude signals of receiving coils 104, 106 are phase shifted by 90° from each other in this position in the electrical angular domain. As a result, these signals amU1 and amU2 are in phase only when the signals U1 and U2 have the same sign—otherwise they are 180° out of phase. The signals amU1 and amU2 are also shifted by 90° to the current in the rotor 101 (according to Faraday's law of induction) and are amplitude modulated, but with zero mean. A circuit (e.g. a phase coherent demodulator) may thus demodulate the amplitude information from the signals amU1 and amU2 to provide the 'upper' parts of the envelopes, which yields the signals U1 and U2, respectively, as shown. Since the signals U1, U2 have a vanishing mean value, the sensor circuit does not need to subtract them as these signals are already astatic and thus stray field robust.

The example inductive angle sensor system shown in FIG. 1 uses a total of two receiving coils 104 and 106, and thus constitutes a two-phase system having a cosine and a sine coil that provide respective induced voltage signals having a phase offset from one another that is related to the rotational offset between the receiving coils 104, 106. However, conventional inductive angle sensors may use pickup coils that comprise more than two receiving coils, such as three receiving coils, for example. In such a case, the pickup coil system may provide a three-phase signal system and the three receiving coils may be referred to as U, V, and W coils instead of sine and cosine coils of the two-phase system discussed above.

Figure 6:
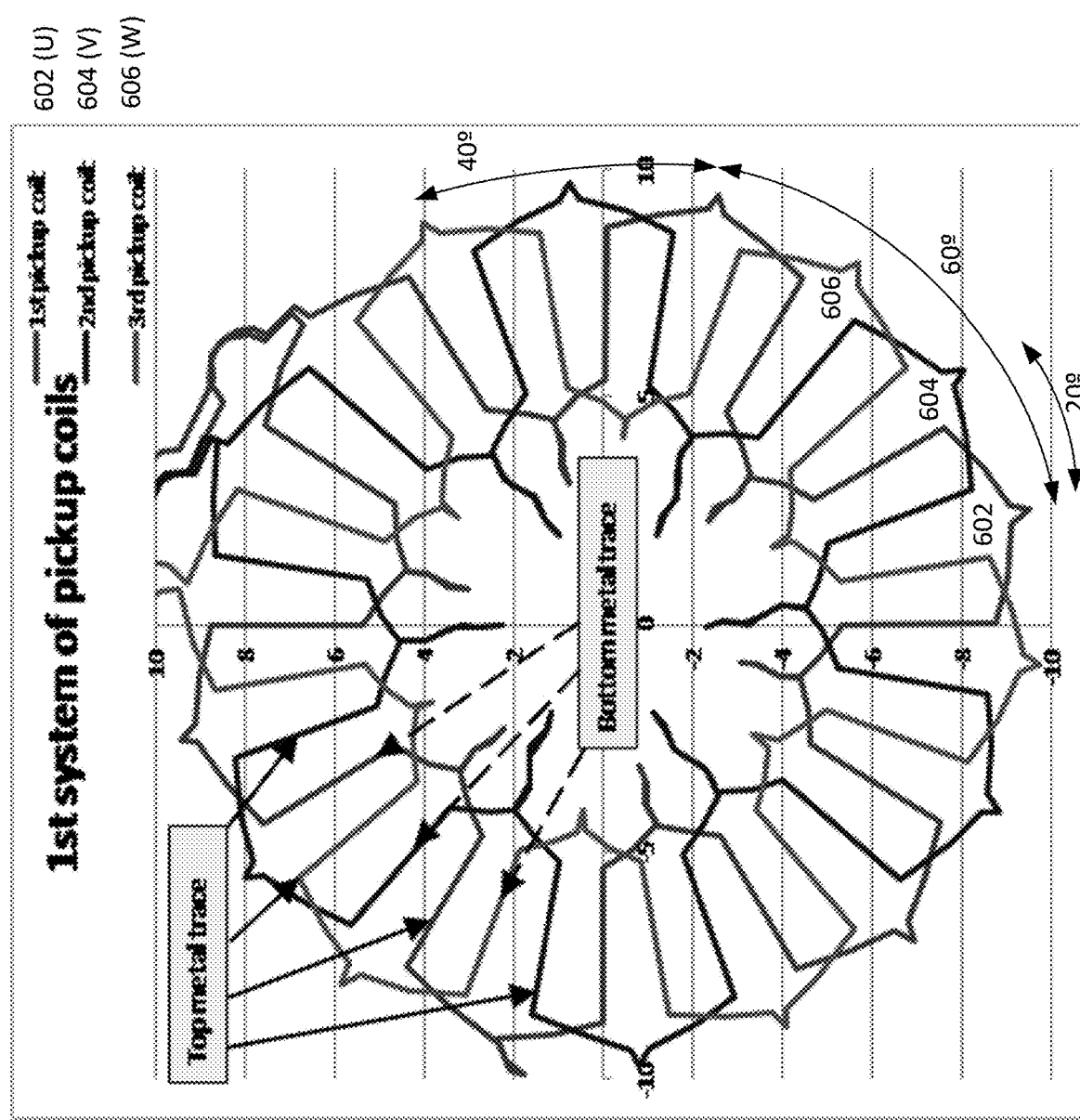
FIG. 6 illustrates an example of receiving coils forming part of a three-phase pickup coil system that are rotated with respect to one another to cause a phase offset between their induced voltage signals.
Figure 7:
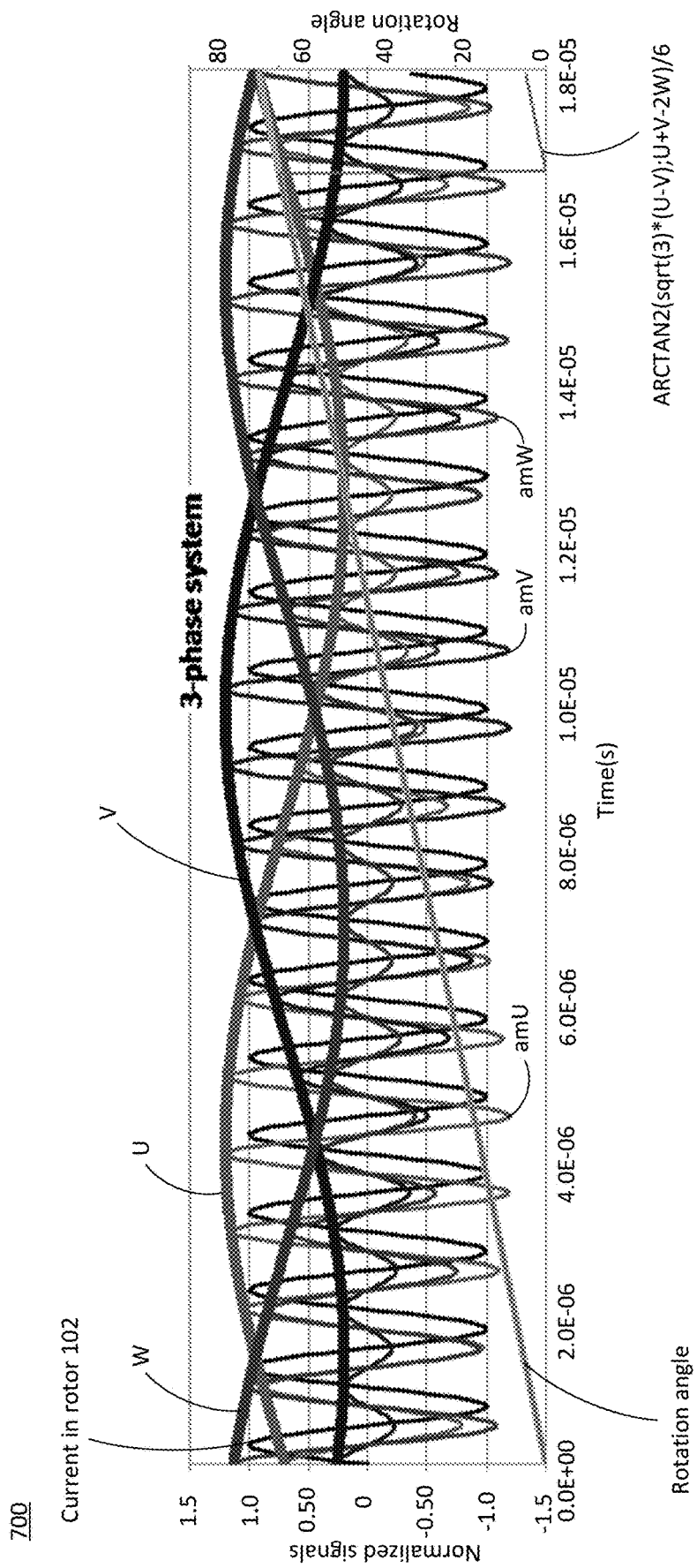
FIG. 7 illustrates an example of the generation of various signals associated with conventional inductive angle sensor architecture of FIG. 1 over time using the three-phase pickup coil system as shown in FIG. 6.

For a three-phase system (or more generally, when the number of pickup coils within a pickup coil system is an odd number of 3 or more), each receiving coil need not be astatic. A circuit may derive the difference between signals induced from the different pairs of the three receiving coils, such as (U–V), (V–W), and (W–U). Conventionally, each of the three receiving coils are identical in shape but rotated with respect to one another by $$\frac{1}{N}\left(\frac{360°}{k}\right),$$

where N is the number of receiving coils and k is the k-fold symmetry of the receiving coil. For example, if the rotor 101 as shown in FIG. 1 has a k-fold symmetry of k=6 (instead of k=3 as shown), each of the receiving coils 602 (U), 604 (V), and 606 (W) may also have a periodicity matching that of the rotor 101, as shown in FIG. 6 (i.e. k=6 because the U, V, W coils shown in in FIG. 6 are not astatic). Continuing this example, each of the receiving coils 602, 604, 606 is rotated against one another by $$\frac{1}{3}\left(\frac{360°}{6}\right),$$

or 20°. Specifically, the second receiving coil 604 is rotated with respect to the first receiving coil 602 by 360°/18=20°, and the third receiving coil 606 is also rotated with respect to the second receiving coil 604 by 20°. Thus, for this three-phase system, when the rotor 101 is rotated at a constant speed, the signals in the coils 602, 604, 606 are sinusoidal with a phase shift of 360°/3=120°. When the rotor turns by 360° (mechanical angle), the envelope of the signals shows a number of periods associated with the k-fold symmetry of the rotor 101, which is 3 in this example. Thus, if one computes the arctan of the ratio of two such signals with a 1200 phase shift from one another, the result will vary by k*360° (k being the periodicity of the rotor 101), which gives 10800 (electrical angle). For example, as shown in FIG. 7 and similar to the calculation in FIG. 5 for the two-phase system, the rotational position of the rotor 101 may be computed via the arctan function from each of the three envelopes. For instance, two intermediate signals S1, S2 may be calculated using S1=sqrt(3)*(U–V), and S2=U+V–(2 W). The rotational position of the rotor 101 may then be computed via the calculation of arctan 2(S1; S2)/6.

An example of the various signals associated with the three-phase receiving coil such as the one shown in FIG. 6, which comprises the three receiving coils 602, 604, 606, as shown in FIG. 7. The graph in FIG. 7 indicates time on the x-axis from 0 to 18 μs, similar to the graph shown in FIG. 5 for the two-phase system. With continued reference to FIG. 7, the current in the rotor 101 once again is the eddy current in the rotor 101, which is excited by the excitation coil (not shown). Assuming an oscillation signal of 1 MHz, the current in the rotor 101 has a constant amplitude and zero mean. Again, the rotor 101 is assumed to rotate with a speed of 360°/100 μs, the same speed as discussed above with reference to the two-phase system shown in FIG. 5. The signals amU, amV, amW are the voltages induced in the three receiving coils 602 (U), 604(V), and 606 (W), which are identical having 6-fold symmetry. The signals U, V, W are obtained by amplitude demodulation of induced signals amU, amV, amW, respectively. Due to the rotational offset of 200 between the receiving coils 602, 604, and 606 as shown and discussed above with reference to FIG. 6, the signals U, V, W are 1200 phase shifted in the angular domain (the electric angle is 6 times the mechanical angle).

The voltage signals amU, amV, and amW are all in phase, but shifted by 90° to the current in the rotor 101 (according to Faraday's law of induction). The voltages amU, amV, amW are amplitude modulated and thus have a carrier frequency with an amplitude that changes according to rotational position of the rotor 101. A suitable circuit demodulates the amplitude information, which gives the (upper, positive parts of the) envelopes, i.e. the signals U, V, and W as shown. The signals U, V, and W have a non-vanishing mean value. Because of this, the signals U, V, and W can be obtained via non-synchronous demodulation, which is a less arduous process compared to a synchronous demodulation. Moreover, each of the signals U, V, and W have the same mean value. An accompanying sensor circuit subtracts U–V, V–W, and W–U, thereby cancelling out this mean, so that only the sinusoidal variation of U, V, and W versus rotation angle remains. The signals amU, amV, amW are not stray-field robust (i.e., not astatic). This means that ambient magnetic flux changes will also induce voltages in amU, amV, amW. However, since the receiving coils 602, 604, 606 are identical and only rotated with respect to one another, homogeneous disturbances are identical in each of the receiving coils and cancel out upon subtraction U–V, V–W, W–U. Note that there are two options: a sensor system may demodulate amU, amV, amW first and then subtract U–V, V–W, W–U; or it may first subtract amU-amV, amV-amW, amW-amU and demodulate these differences. In the graph as shown in FIG. 7 the first procedure is shown for ease of explanation, although in practice the second procedure may also be implemented.

Inductive Angle Sensor System in Accordance with the Embodiments

Figure 8:
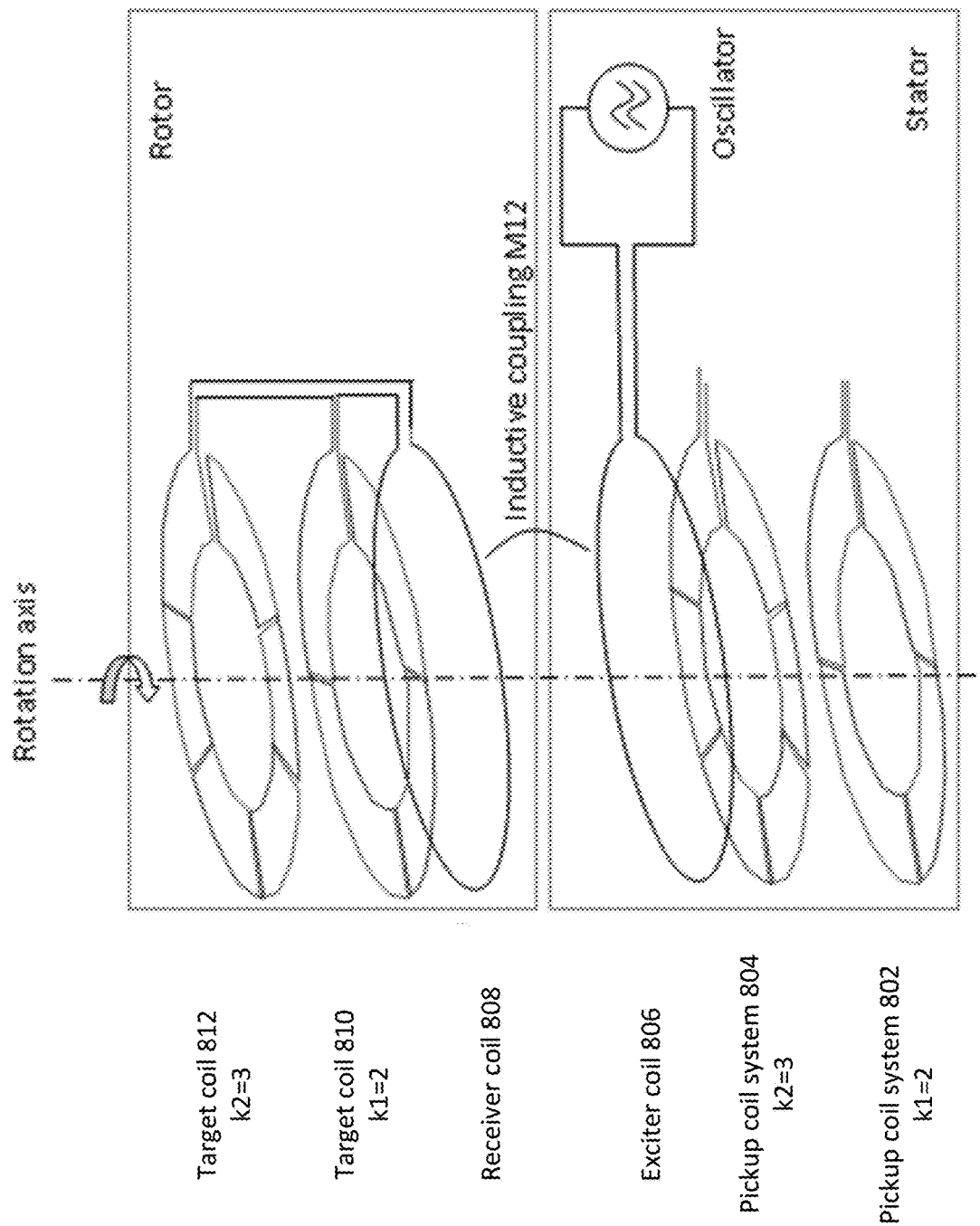
FIG. 8 illustrates an example of an inductive angle sensor system used in accordance with one or more embodiments of the disclosure.
Figure 9:
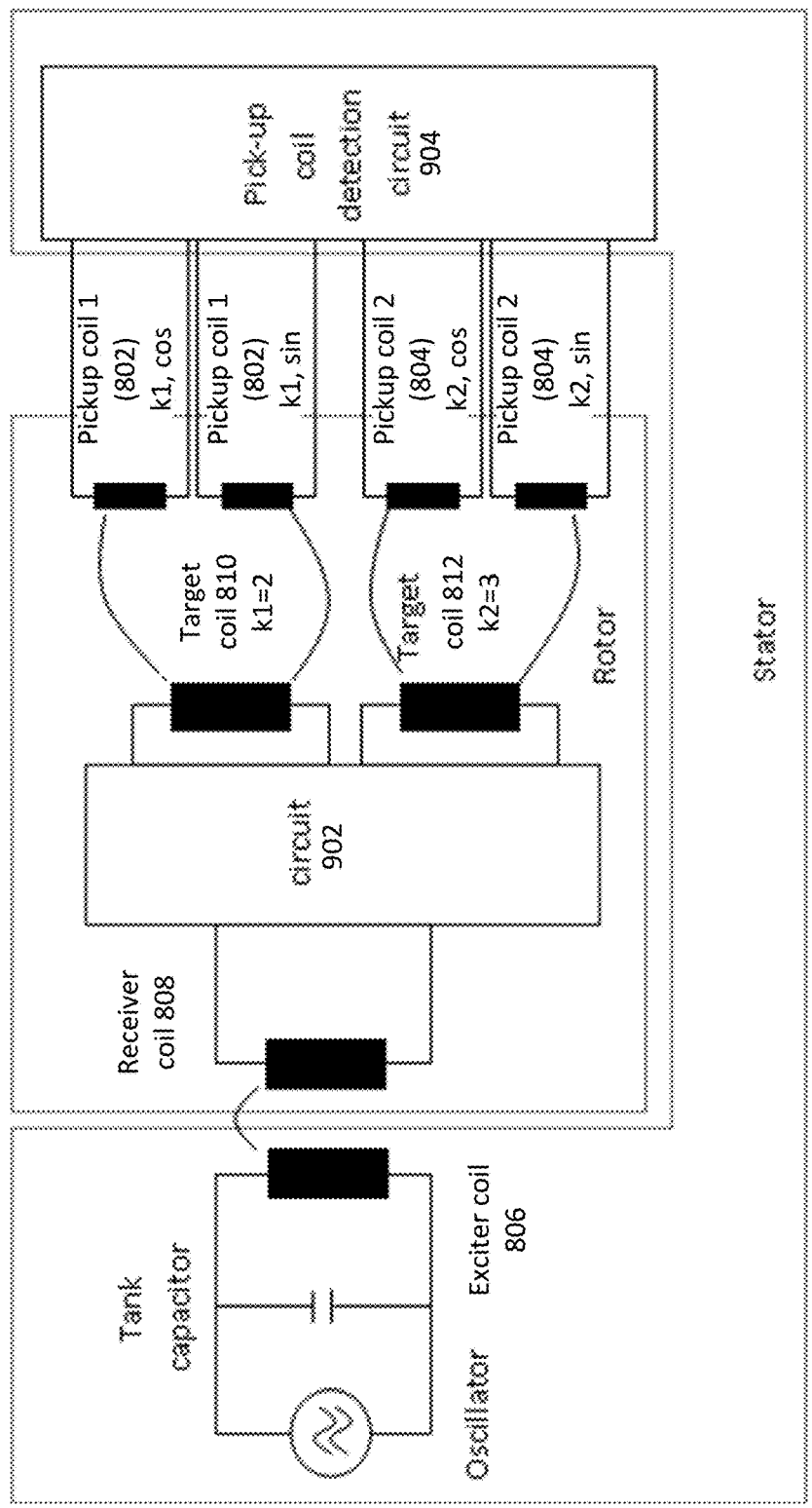
FIG. 9 illustrates an example of an inductive angle sensor circuitry used with the inductive angle sensor system of FIG. 8 used in accordance with one or more embodiments of the disclosure.

FIG. 8 illustrates an example of an inductive angle sensor system used in accordance with one or more embodiments of the disclosure. The inductive angle sensor system 800 as shown in FIG. 8 may be used in conjunction with the inductive angle sensor circuitry 900 as shown in FIG. 9. The overall system may be further adapted in accordance with the embodiments described herein, as further discussed below, to provide an inductive torque sensor. The inductive angle sensor system 800 differs from those discussed above in various ways. For instance, the inductive angle sensor system 800 uses separate pickup coil systems, each comprising two or more pickup coils and independently operating in conjunction with corresponding target coils. The inductive angle sensor system 800 also uses a separate receiver coil that is inductively coupled to the exciter coil via an air gap. The receiver coil is coupled to the target coils to provide induced current into the target coils, which causes each corresponding pickup coil to receive and output a voltage signal that varies with respect to the angle between each target coil and respective pickup coil pairing. Moreover, the inductive angle sensor system 800 may utilize coil windings coupled to a rotating shaft or other component as the target coils instead of the use of massive metal rotors, although such components may still function in accordance with such a system.

For instance, as shown in FIG. 8, the inductive angle sensor system 800 independently and separately determines the mechanical angle of rotation of a rotor component by calculating the angle of each of the target coils with respect to each respective inductively coupled pickup coil system. To do so, the inductive angle sensor system 800 includes a rotor side and a stator side. The rotor side includes a rotatable component (e.g. a rotatable shaft) that rotates about the rotation axis as shown and is coupled to the target coils 810, 812 and the receiver coil 808. The rotor portion thus includes three coils: the secondary power coil or receiver coil 808, the target coil 810 which is astatic and of k1 fold symmetry or periodicity (k1=2 in this example), and a target coil 812 which is also astatic and has a different k2 fold symmetry or periodicity (k2=3 in this example).

The stator portion includes at least five coils, with three being shown in FIG. 8 for purposes of brevity. These include the exciter coil or primary power coil 806, a first pickup coil system 802 (which includes two astatic and rotationally offset coils, with one being shown), and a second pickup coil system 804 (which also includes two astatic and rotationally offset coils, with one being shown). Each of the astatic pickup coils in the pickup coil system 802 may have the same k1-fold symmetry as one another and as the target coil 810, being k1=2 in this example. The second coil that is not shown in FIG. 8 that forms part of the pickup coil system 802 may be identical to the coil that is shown, but be rotated around the rotation axis by 360°/k1/4, or 45 degrees in this example. Likewise, the second coil that is not shown in FIG. 8 that forms part of the pickup coil system 804 may be identical to the coil that is shown, but be rotated around the rotation axis by 360°/k2/4, or 30 degrees in this example. Thus, each of the pickup coil systems 802, 804 may include a set of sine and cosine coils that form part of a two-phase system, as discussed herein.

An oscillator powers the exciter coil 806 with an AC signal having any suitable amplitude and frequency. This couples electrical energy (via magnetic field as a result of the inductive coupling between the exciter coil 806 and the receiver coil 808) into the receiver coil 808, which is coupled to the rotor. The exciter coil 806 does not couple into the target coils 810, 812, however, because the target coils 810, 812 are astatic coils. That is, each of the target coils 810, 812 may have adjacent windings in opposite directions, as discussed above with reference to FIGS. 4A-4B. In other words, the mutual inductance between the exciter coil 806 and each of the target coils 810, 812 is zero. The exciter coil 806 and the receiver coil 808 thus function as a transformer that has no iron core—both are coupled only via air. Preferably, the power transmitted via the exciter coil 806 is independent on the rotational position, and therefore the exciter coil 806 and the receiver coil 808 should be rotationally symmetric circles or spirals. The two target coils 810, 812 are conductively coupled to the receiver coil 808. This is typically implemented by connecting the target coils 810, 812 in series across the receiver coil 808. Optionally, a circuit may be coupled between the receiver coil 808 and the target coils 810, 812 to improve efficiency. This may include a series capacitor, for instance, which makes a series resonant circuit to reduce the impedance on the "secondary" side of the "transformer."

As a result of this configuration, a strong induced current flows through the target coils 810, 812. Since both target coils are astatic and k1 differs from k2, their mutual inductance vanishes That is, the mutual inductance between both target coils 810, 812 has a magnitude that is significantly less than the self-inductance of either target coil 810, 812 (e.g. one-tenth or less in magnitude). Therefore, there is no magnetic interaction between the target coils 810, 812. The reduced magnetic interaction between the target coils 810, 812 is advantageous in this manner, as it would otherwise reduce the power efficiency of the system. The target coils 810, 812 thus generate ac-magnetic field patterns of k1-fold and k2-fold symmetry, respectively, which rotate synchronously with the rotor.

Again, the stator portion comprises two independent pickup coil systems 802, 804, each comprising two rotationally offset sine and cosine coils. The pickup coil system 802 detects ac-magnetic field patterns of k1-fold symmetry, whereas the pickup coil system 804 detects ac-magnetic field patterns of k2-fold symmetry. Because k1 and k2 have no common divisor, there is no crosstalk. This means that the pickup coil system 802 with k1-fold symmetry does not respond to the magnetic field pattern generated by the target coil 812 having k2-fold symmetry, and the pickup coil system 804 with k2-fold symmetry does not respond to the magnetic field pattern of the target coil 810 having k1-fold symmetry. Therefore, the pickup coil system 802 can extract the rotational position of the target coil 810 independently of the target coil 812, and the pickup coil system 804 can extract the rotational position of the target coil 812 independently of the target coil 810.

The inductive angle sensor system 800 as shown in FIG. 8 is represented in FIG. 9 as part of inductive angle sensor circuitry 900, which may be used to calculate the rotational position of each of the target coils 810, 812 and, in turn, the angle of the rotor to which the target coils 810, 812 are each coupled and rotate synchronously as the rotor also rotates. For instance, the inductive angle sensor circuitry 900 includes a circuit 902, which may represent circuitry (e.g. a series capacitor) coupled between the receiver coil 808 and the target coils 810, 812 to improve efficiency, as noted above. Moreover, the inductive angle sensor circuitry 900 includes a pickup coil detection circuit 904, which is coupled to each of the sine and cosine coils that comprise each respective pickup coil system 802, 804.

The pickup coil detection circuit 904 may include any suitable type of circuitry (e.g. phase-synchronous demodulators, phase coherent demodulators, amplitude demodulators, etc.) to recover the envelopes of the signals received from the pickup coil systems 802 and 804 that are induced via each respectively coupled target coil 810, 812, as discussed above. The pickup coil detection circuit 904 may also include one or more processors or other suitable hardware configured to compute an angle phi1', which represents the rotational position of the target coil 810 on the basis of signals provided by the k1-pickup coil system 802. The pickup coil detection circuit 904 may also compute an angle phi2', which represents the rotational position of the target coil 812 on the basis of signals provided by the k2-pickup system 804. The rotational position of the rotor to which the target coils 810, 812 are coupled is represented as phimech'.

A good approximation holds that:

$$phi1'=\mod(k1*phimech; 360°); \text{ and} \quad \text{Eqn. 1:}$$

$$phi2'=\mod(k2*phimech; 360°). \quad \text{Eqn. 2:}$$

Thus, by comparing the two angles phi1', phi2' according to nonius principles (Vernier principle) the pickup coil detection circuit 904 may derive the unique angle phimech of the rotor to which the target coils 810, 812 are coupled in the full range of 0° to 360°.

Inductive Torque Sensor Systems

Figure 10A:
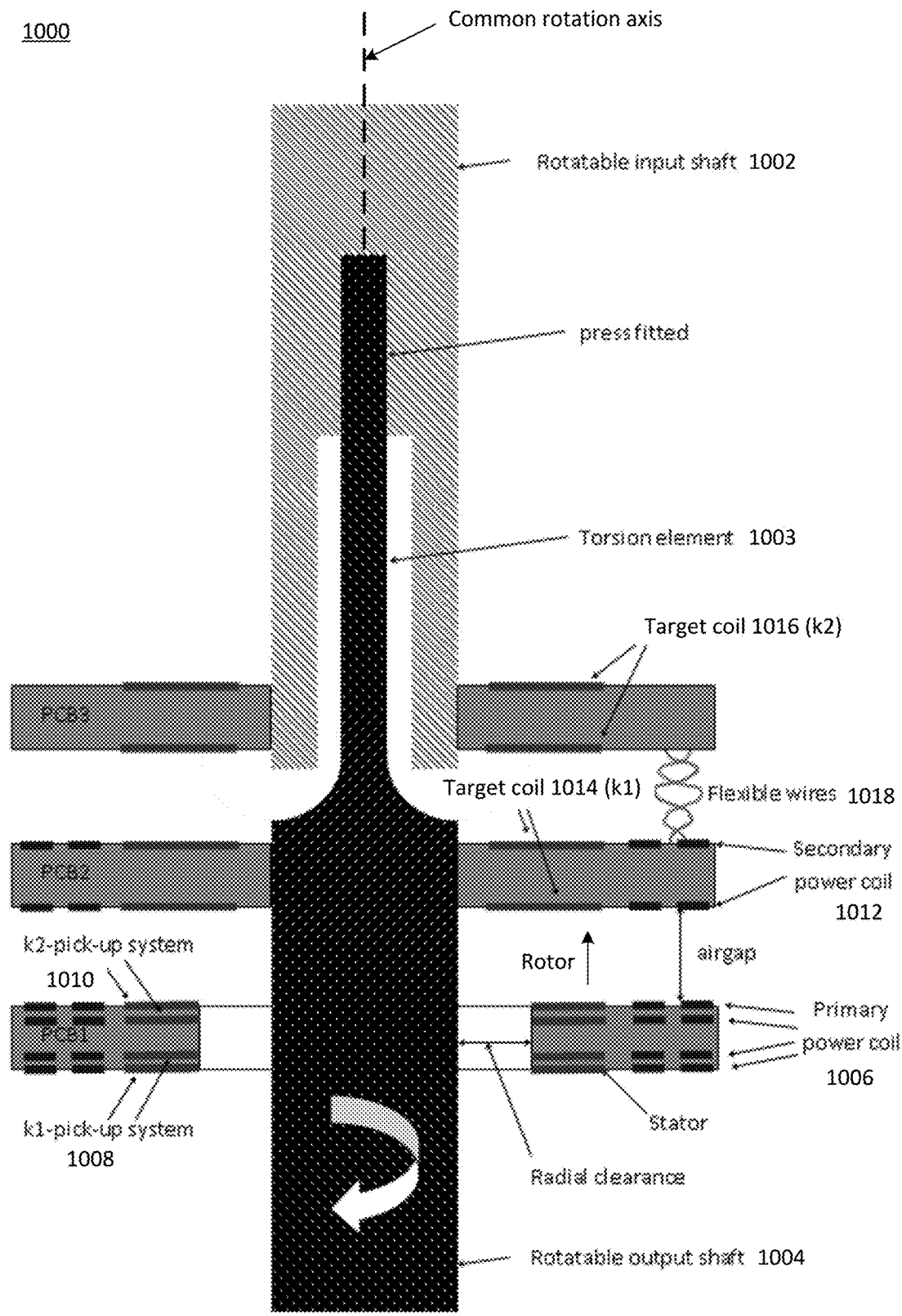
FIG. 10A illustrates one example inductive torque sensor system, in accordance with one or more embodiments of the disclosure.
Figure 10B:
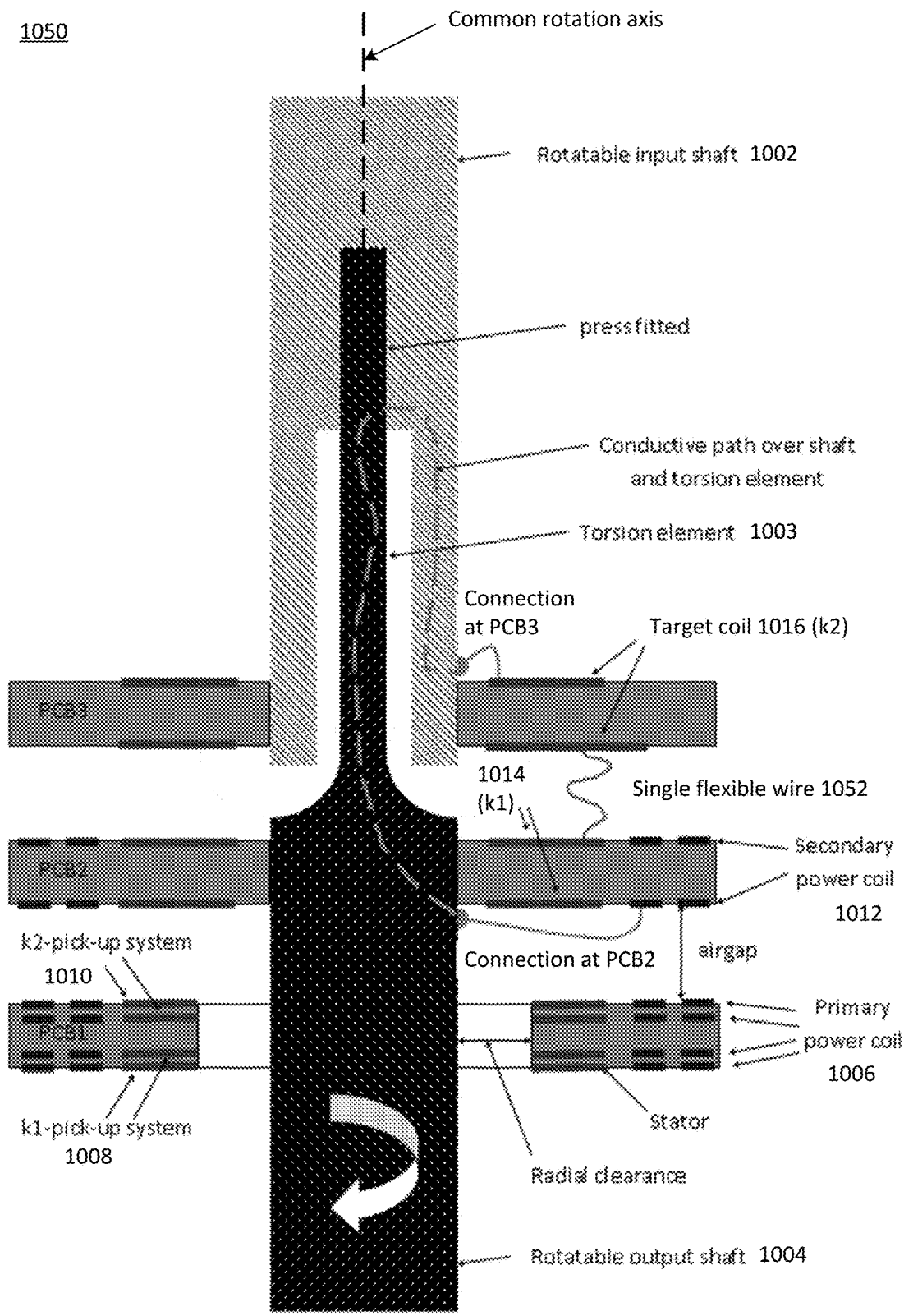
FIG. 10B illustrates another example inductive torque sensor system, in accordance with one or more embodiments of the disclosure.
Figure 11A:
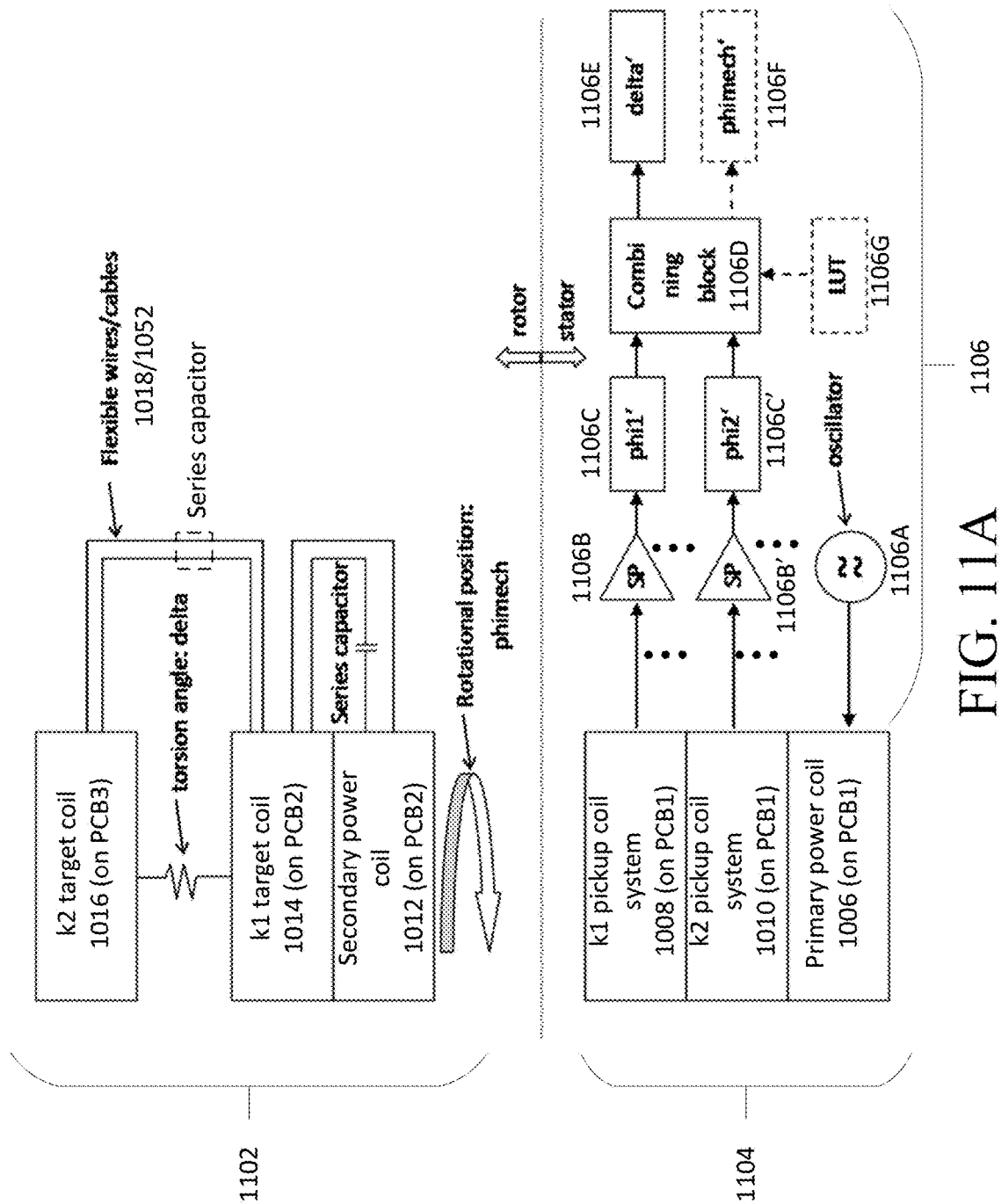
FIGS. 11A and 11B illustrates a block diagram of example inductive torque sensor system circuitry, in accordance with one or more embodiments of the disclosure.
Figure 11B:
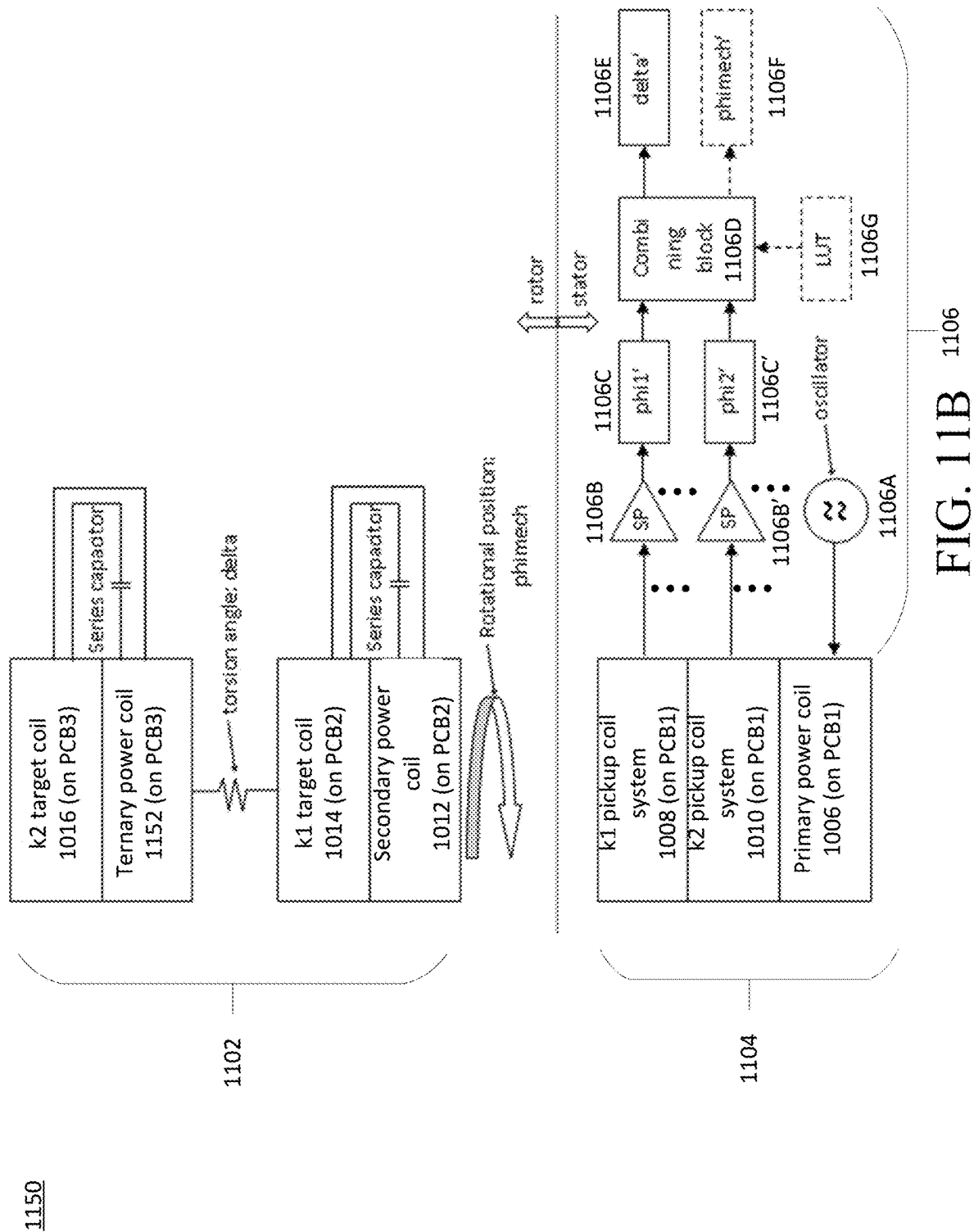

Example inductive torque sensor systems in accordance with one or more embodiments of the disclosure are shown in FIG. 10A-10B, and the computational functionality and accompanying circuitry associated with these example inductive torque sensor systems is further discussed with respect to FIGS. 11A-11B. The two inductive torque sensor systems as shown in FIGS. 10A and 10B include several identical or common components, and thus only the differences between them are discussed herein for purposes of brevity. These differences are by way of example and not limitation, and the embodiments described herein may include the example inductive torque sensor systems being further modified using additional, alternative, or fewer components.

In an embodiment, the inductive torque sensor system 1000 as shown in FIG. 10A includes a rotatable input shaft 1002 that may be coupled to any suitable type of mechanical component (i.e. an actuator) that causes the rotatable input shaft 1002 to rotate in accordance with any suitable range of angular rotation (e.g., 360 degrees). The rotatable output shaft may in turn be coupled to any suitable type of load from which measurable torque may be transmitted under certain conditions as the rotatable input shaft 1002 rotates about the common rotation axis. The rotatable input shaft 1002 is coupled to a rotatable output shaft 1004 via a press fit as shown, although any other suitable type of fitting or coupling may be implemented. For example, the inductive torque sensor systems 1000, 1050 as shown in FIGS. 10A-10B include the torsion element 1003 being formed from the fitting of the rotatable input shaft 1002 with the rotatable output shaft 1004. However, this is one example and other implementations are possible in accordance with the embodiments as discussed herein. For instance, the torsion element 1003 may be formed from two toothed wheels, which are mounted on their respective shafts via flexible rubber or springs. This gear may thus function as a torsion element to indicate the transmission of torque between the rotatable input shaft 1002 to the rotatable output shaft 1004.

The coupling between the rotatable input shaft 1002 and the rotatable output shaft 1004 forms a torsion element 1003. The rotatable input shaft 1002 and the rotatable output shaft 1004 are coaxial with one another, i.e. each are concentric with and share a common rotation axis as shown in FIG. 10A. The rotatable input shaft 1002 and the rotatable output shaft 1004 form a torsion angle between one another when torque is transmitted in response to rotation of the rotatable input shaft 1002 to the load (not shown) to which the rotatable output shaft 1004 is coupled. This torsion angle is referred to herein as a "delta" angle, and may be set to any suitable range of values less than the overall range of angular rotation of the rotatable input shaft 1002. For instance, the rotatable input shaft 1002 and the rotatable output shaft 1004 may form a torsion angle of ±10 degrees, ±5 degrees, ±3 degrees, etc., with respect to an at rest position of the rotatable input shaft 1002 and the rotatable output shaft 1004 during which no torque is transmitted.

With continued reference to FIG. 10A, the inductive torque sensor system 1000 includes a stator portion and a rotor portion. The stator portion includes a PCB (PCB1) or other suitable substrate upon which the various conductive paths (e.g. traces, bonded wires, etc.) having any suitable number of layers may be disposed, and which may include an appropriate cutout providing a radial clearance through which the rotatable output shaft 1004 extends. The conductive paths on the substrate may be arranged to form the pickup coils in each of the pickup coil systems 1008, 1010, as well as the primary power coil 1006, which may alternatively be referred to herein as a transmitting coil, an exciter coil, or an excitation coil. Each of the coils included in the stator portion (e.g. the primary power coil 1006 and the pickup coil systems 1008, 1010) are also disposed coaxially about the common rotation axis.

The primary power coil 1006 may include any suitable number of conductive paths in any suitable configuration and/or number of windings, although rotationally symmetric circles or spirals are preferable as discussed above with reference to FIG. 8. The pickup coil systems 1008, 1010 may each include any suitable number of rotationally offset pickup coils of any suitable k-fold symmetry. For example, the pickup coil system 1008 may include two or more pickup coils that each have any suitable k-fold periodicity of k1 and are rotated with respect to one another in accordance with this periodicity and the total number of coils in the pickup coil system 1008 to ensure the proper phase offset of induced or "picked up" signals, as discussed above.

For example, each one of the pickup coils included in the pickup coil system 1008 may be rotationally offset from one another in a circumferential direction in accordance with the function $$\frac{1}{2N}\left(\frac{360°}{k1}\right)$$

for an even number N of coils in the pickup coil system 1008, and in accordance with the function $$\frac{1}{N}\left(\frac{360°}{k1}\right)$$

for an odd number N of coils in the pickup coil system 1008, with k1 representing the periodicity in each case. The pickup coil system 1010 may likewise include two or more pickup coils that each have any suitable k-fold periodicity of k2 and are rotated with respect to one another in accordance with this periodicity and the total number of coils in the pickup coil system 1010. In an embodiment, the k-fold periodicity k1 and the k-fold periodicity of k2 are different than one another to eliminate cross-talk between the adjacent pickup coil systems 1008, 1010, as discussed above with reference to FIG. 8. The use of the rotational offsets described herein is provided by way of example and not limitation. The pickup coil systems 1008, 1010 may include two or more coils having a different or more elaborate configuration than the example coil windings as discussed herein. For example, the pickup coils of one or more of the pickup coil systems 1008, 1010 may comprise several turns around the rotation axis with certain turns rotated against one another by an amount that may be less than or greater than $$\frac{1}{2N}\left(\frac{360°}{k1}\right)$$

or $$\frac{1}{N}\left(\frac{360°}{k1}\right),$$

as the case may be. Such deviations of the rotational offset among the pickup coils may reduce the systematic angle error.

The pickup coil systems 1008, 1010 may include any suitable number of individual pickup coils. For instance, the pickup coil systems 1008, 1010 may include two pickup coils each, which are astatic coils arranged, for example, having adjacent windings in the opposite direction similar to those shown in FIGS. 4A-4B to form a two-phase system (i.e. the coils may include a sine and a cosine coil as discussed herein). As another example, the pickup coil systems 1008, 1010 may include three pickup coils each, which need not be astatic coils and are arranged, for example in a manner similar to those shown in FIG. 6 to form a three-phase system (i.e. the coils may include U, V, W coils as discussed herein).

The use of two- and three-phase systems are by way of example and not limitation, and the embodiments herein may use pickup coils having any suitable number of coils, which may have any suitable configuration (e.g. astatic or non-astatic). Of course, although occupying the same substrate (PCB1), the primary power coil 1006 and the individual coils included in each of the pickup coil systems 1008, 1010 may be routed via different layers of the substrate to avoid shorting out with one another. Thus, there may be practical limitations to the number of pickup coils that may be used. In any event, embodiments include the primary power coil 1006 and the individual coils included in each of the pickup coil systems 1008, 1010 terminating via suitable connections and/or terminals, which are each separately coupled to additional circuitry so that the torsion angle may be calculated, as further discussed below with reference to FIGS. 11A-11B.

The rotor portion of the inductive torque sensor system 1000 includes a second PCB (PCB2) or other suitable substrate that is coupled or otherwise mounted to the rotatable output shaft 1004, and a third PCB (PCB3) or other suitable substrate that is coupled or otherwise mounted to the rotatable input shaft 1002. The second PCB (PCB2) includes various conductive paths (e.g. traces, bonded wires, etc.) having any suitable number of layers arranged to form a target coil 1014 and a secondary power coil 1012, which may alternatively be referred to herein as a receiving coil. The target coil 1014 may be wound as an astatic coil arranged in any suitable configuration having a k-fold symmetry of k1, which matches that of the coils in the pickup coil system 1008. The secondary power coil 1012 may include any suitable number of conductive paths in any suitable configuration and/or number of windings, but again rotationally symmetric circles or spirals are preferable. The third PCB (PCB3) includes various conductive paths (e.g. traces, bonded wires, etc.) having any suitable number of layers arranged to form a target coil 1016. Similar to the target coil 1014, the target coil 1016 may be wound as an astatic coil arranged in any suitable configuration having a k-fold symmetry of k2, which is different than that of the target coil 1016 but matches that of the coils in the pickup coil system 1010. Each of the coils included in the rotor portion (e.g. the secondary power coil 1012, a ternary power coil if present, and the target coils 1014, 1016) are also disposed coaxially about the common rotation axis. Again, because the target coils 1014, 1016 have different k-fold symmetry values, the mutual inductance between the target coils 1014, 1016 has a magnitude that is significantly less than the self-inductance of either target coil 1014, 1016 (e.g. one-tenth or less in magnitude).

Thus, because the target coil 1016 is coupled to the rotatable input shaft 1002 and the target coil 1016 is coupled to the rotatable output shaft 1004, the target coils 1014, 1016 rotate with respect to one another when torque is transmitted from the rotatable input shaft 1002 to the rotatable output shaft 1004 to form the torsion angle delta. The torsion angle delta may be measured by independently determining the rotational position of the target coils 1014, 1016. In an embodiment, the axial spacing between the target coils 1014, 1016 may be any suitable distance, but it is preferable to maintain this spacing relatively small (e.g. on the order of 0.5 mm). But because the use of the different k-fold symmetries, such a small spacing does not present an issue as the target coils 1014, 1016 may function independently of one another and avoid crosstalk.

Thus, similar to the inductive angle sensor system 800 as shown in FIG. 8, the inductive torque sensor system 1000 also uses a set of power coils 1006, 1012, a set of pickup coil systems 1008, 1010, and a set of target coils 1014, 1016, each sharing a common rotation axis and thus being disposed coaxial with the common rotation axis and the torsion element 1003. However, unlike the inductive angle sensor system 800, the inductive torque sensor system 1000 requires that the target coils rotate with respect to one another by the torsion angle delta. Thus, because the target coils 1016, 1014 are mounted to the rotatable input shaft 1002 and the rotatable output shaft 1004, respectively, embodiments include the use of a means to couple electrical energy from the primary power coil 1006 on the PCB1 of the stator portion to both target coils 1014, 1016, which are located on separate substrates. This may be done in various ways, with several examples further discussed below.

In an embodiment, a common power coil is used to provide both target coils 1014, 1016 with electrical energy. An example of the use of a common power coil for this purpose is shown in FIG. 10A-10B, in which the secondary power coil 1012 serves this purpose. In particular, the secondary power coil 1012 is inductively coupled to the primary power coil 1006 via an air gap between them, which separates the stator and rotor portions. In an embodiment, the configuration of the primary power coil 1006 and secondary power coil 1012 in this manner is such that a mutual inductance is formed between them that is constant with respect to a rotation angle of the primary power coil 1006, a rotation angle of the secondary power coil 1012, and the torsion angle delta.

The secondary power coil 1012 is in turn conductively coupled to each of the target coils 1014, 1016 in a similar manner as the target coils 810, 812 are coupled to the receiver coil 808 as shown in FIG. 8. Thus, the secondary power coil 1012 may be conductively coupled to the target coil 1014 via the connections on the shared PCB2 (which may also include series capacitance and/or other circuitry connections). However, the target coil 1016 also needs to be conductively coupled to the secondary power coil 1012, which may be implemented via the flexible cables/wires 1018 as shown in FIG. 10A. In other words, the target coils 1014, 1016 each include at least two conductors to connect to one another, because both terminals associated with each of the target coils 1014, 1016 need to be connected. The flexible wires 1018 may be implemented for this purpose, and comprise any suitable material to ensure appropriate durability as the target coils 1014, 1016 rotate against one another when torque is transmitted.

Another example of the conductive coupling between the secondary power coil 1012 and the target coil 1016 includes the secondary power coil 1012 and the target coil 1016 being coupled to one another via the rotatable output shaft 1004. In this example, although the target coils 1014, 1016 each include at least two conductors to connect to one another, the rotatable input shaft 1002 and the rotatable output shaft 1004 are constructed of a suitable electrically conductive material for this purpose (e.g. metal), and electrical energy is thus provided via a path formed between a local connection at PCB2 to the secondary power coil 1012, a local connection at the PCB 3 to the target coil 1016, and a conductive path formed over the rotatable input shaft 1002 and the rotatable output shaft 1004 as shown as a product of the electrical conductivity of each of these materials. In such a case, only a single flexible wire 1052 is needed to connect the second terminal of the target coil 1016. As shown in FIG. 10B, the conductive path over the rotatable input shaft 1002 and the rotatable output shaft 1004 may include bonding the wire at each of the PCB2 and PCB 3 to the rotatable output shaft 1004 and the rotatable input shaft 1002, respectively, as shown in FIG. 10B, to provide a connection between one of the terminals of the secondary power coil 1012 the other terminal to the target coil 1016.

As yet another example, each of the target coils 1014, 1016 may receive power via a dedicated power coil, which eliminates the need to couple any flexible wires across the torsion element. In accordance with such embodiments, the secondary power coil 1012 is inductively coupled to the primary power coil 1006 and conductively coupled to the target coil 1014 to provide power to the target coil 1014. Moreover, a ternary power coil may be used, which is not shown in FIG. 10B but may be included as part of the PCB3 in a similar manner as the secondary power coil 1012 is provided on the PCB2 for the target coil 1014. In accordance with such embodiments, the ternary power coil is also inductively coupled to the primary power coil 1006 and conductively coupled to the target coil 1016 to provide power to the target coil 1016. The use of the ternary coil system is further discussed further below with reference to FIGS. 11A-11B.

The configuration, arrangement, and physical relationship among the various power coils, pickup coils, and target coils as shown and discussed with reference to FIGS. 10-10B and further below with reference to FIGS. 11A-11B is by way of example and not limitation. For example, one or more of the PCB1, PCB2, and/or PCB3 (or other suitable substrate) may be split into multiple layers and/or PCBs, the details of which are not shown for purposes of brevity. That is, PCB1 may be formed of a PCB1a, PCB1b, etc., to facilitate the various coils, connections, terminals, etc., to be disposed thereon.

Moreover, and regardless of the configuration and usage of the power coils, embodiments include a series capacitor and/or other suitable circuitry being optionally coupled between each of the common or dedicated power coils and one or both of the target coils to which the respective power coils provide electrical energy via a conductive coupling. Again, doing so increases the operating efficiency as discussed herein. Further, the use of other types of circuits in addition to or instead of the use of an in-series capacitor may be implemented in accordance with the embodiments discussed herein to advantageously improve the power transferred from the power coil(s) to the target coil(s).

The embodiments described herein also include alternative mounting configurations and using an alternate order of the various components than the examples shown in FIGS. 10A-10B. For instance, the various coils and other components shown in FIGS. 10A-10B and 11A-11B may be mounted to different PCBs than the examples shown. That is, the placement of the various target coils, power coils, and pickup coils with respect to one another and the spacing between such components may deviate from the configuration shown in FIGS. 10A-10B and 11A-11B. For example, each of the target coils 1012, 1016 is shown in FIGS. 10A-10B as being disposed on the same side of the stator circuitry. Although this is by way of example and not limitation, and the target coils 1012, 1016 could be disposed on opposite sides of the stator board(s) (e.g. PCB1 and the primary power coil 1006 and pickup coil systems 1008, 1010), it is preferable to not place the stator board(s) (e.g. PCB1) between the target coils 1012, 1016 because this complicates the assembly procedure and worsens the stability and accuracy of the system during product lifetime as the air gap between the stator and rotor may change over time.

As another example, the example inductive torque sensor systems 1000, 1050 as shown in FIGS. 10A-10B illustrate the secondary power coil 1014 being coupled to the rotatable output shaft 1004 via the mounting configuration of the PCB2. However, this is by way of example and not limitation, and the secondary power coil 1014 could alternatively be coupled to the rotatable input shaft 1002. For instance, the secondary power coil 1014 may be disposed on the PCB3 with the target coil 1016 instead of being disposed on the PCB2 with the target coil 1014.

In the various embodiments described herein, it is recognized that the magnetic field of a target coil decays steeper versus distance for higher periodicity. Thus, if target coil 1016 has greater periodicity than target coil 1014, the distance between the target coil 1016 and the pickup coils of the pickup coil system 1010 should be smaller than the distance between the target coil 1014 and the coils of the pickup coils system 1008, irrespective of the position of the primary, secondary, and ternary (if present) power coils. Moreover, the primary, secondary, and ternary power coils may be assumed to have a k-fold periodicity of 1 (=360°). Therefore, the magnetic fields generated by the primary, secondary, and ternary power coils decay only moderately with distance. If the inductive torque sensor system 1000 has primary, secondary, and ternary power coils (one on the stator portion, one for the target coil 1014, and one for the target coil 1016), and if each target coil is formed from a single PCB with its own dedicated power coil, then the target coil nearest to the primary power coil 1006 will receive a slightly higher coupled power compared to the target coil that is located further from the primary power coil 1006. As a result, it is beneficial if the nearer target coil has the highest periodicity.

With this in mind, an alternate example of a spatial sequence in the axial direction moving away from the primary power coil 1006 compared to that shown in FIGS. 10A-10B and 11A-11B may be ordered as (1) the primary power coil 1006, (2) the pickup coils associated with the pickup coil systems 1008, 1010 in any order, (3) the target coils 1014, 1016 arranged from closest to furthest from the primary power coil 1006 by order of decreasing k-fold symmetry periodicity, and (4) the secondary power coil 1012 and an optional ternary power coil. That is, the power coils may tolerate a larger spacing between one another compared to the target and pick-up coils, because the AC magnetic field of the power coils decays less in space compared to the fields of the astatic target coils (particularly if k1 and k2 are large). However, if the target coils 1014, 1016 are supplied by a single secondary power coil, and it is possible to place the secondary power coil 1012 on the same substrate as the target coil 1012 or 1014 (as shown in FIG. 10A for the target coil 1014), it is preferable to place the secondary power coil 1012 on the same board as this target coil, which is closer to the primary power coil 1006 on the stator.

It is noted that the example values of k-fold symmetry used with reference to FIGS. 10A-10B and 11A-11B are k1=2 and k2=3, which are provided for ease of explanation to match those in FIG. 8. Thus, the target coil positions as shown in FIGS. 10A-10B and 11A-11B may be, for example, switched from what is shown in FIGS. 10A-10B and 11A-11B such that the target coil 1016, which has a higher k-fold symmetry periodicity of 3, may be placed closer to the primary power coil 1006 as noted above. As another example, and also in accordance with the alternative ordering of the components as noted above, the secondary power coil 1012 and/or the ternary power coil 1152 (as further discussed below with reference to FIG. 11B) may be disposed further from the primary power coil 1006 than the target coils 1012, 1014. This may be implemented, for instance, by the secondary power coil 1012 being formed as part of the PCB3, which may also include the target coil 1014 instead of the target coil 1016 as shown.

Turning now to FIGS. 11A-11B, an example block diagram of inductive torque sensor system circuitry is shown, which may be used to calculate the torsion angle delta in accordance with the inductive torque sensor system configuration as shown in FIGS. 10A-10B. FIG. 11A also provides additional details with respect to the use of a common power coil for the target coils 1014, 1016. FIG. 11B provides additional details with respect to the use of dedicated power coils for the target coils 1014, 1016, and thus illustrates a ternary power coil 1152, which is further discussed below.

As shown in FIG. 11A, the rotor portion 1102 comprises the rotating components of the inductive torque sensor system 1000 and includes the secondary power coil 1012, the target coils 1014, 1016, and any accompanying conductive paths, traces, circuitry, terminals, connections, components, etc. associated therewith. Thus, the various components associated with the rotor portion 1102 may be alternatively referred to herein as "rotor circuitry." This may include, for example, PCB2, PCB3, additional PCBs or substrates not shown in the Figures, the connections and/or traces formed on the PCB2 and PCB3 that form the various coil structures, terminals, coil windings, couplings between the secondary power coil 1012 and the target coils 1014, 1016, optional capacitors or other circuitry coupled in series between the secondary power coil 1012 and the target coils 1014, 1016, etc.

Moreover, the stator portion 1104 comprises the stationary components of the inductive torque sensor system 1000 and includes the primary power coil 1006 and the pickup coil systems 1008, 1010 (and the accompanying pickup coils associated therewith). The stator portion 1104 also includes any accompanying conductive paths, traces, circuitry, terminals, connections, components, etc. associated therewith, which includes the connections, terminals, couplings, etc. to the torque angle calculation circuitry 1106 as well as the components that form the torque calculation circuitry 1106. The torque angle calculation circuitry 1106 may include components formed on the PCB 1 or another PCB or external component coupled to the various components on PCB1, as further discussed below. Thus, the various components associated with the stator portion may be alternatively referred to herein as "stator circuitry." Again, this may include, for example, the PCB1, additional PCBs or substrates not shown in the Figures, the connections and/or traces formed on the PCB1 that form the various coil structures, terminals, coil windings, couplings between the primary power coil 1006, the pickup coil systems 1008, 1010 and the torque calculation circuitry 1106, etc.

The example block diagram of inductive torque sensor system circuitry 1150 shown in FIG. 11B is identical to the inductive torque sensor system circuitry 1000 as shown in FIG. 11A with the exception of power coil configuration that forms part of the rotor circuitry 1102. Again, the rotor circuitry 1102 of the inductive torque sensor system circuitry 1000 as shown in FIG. 11A includes a secondary power coil 1012 that is common to both the target coils 1014, 1016. Thus, the secondary power coil 1012 power coil as shown in FIG. 11A is inductively coupled to the primary power coil 1006 and conductively coupled to each of the target coils 1014, 1016, with an optional capacitor and/or other suitable circuitry being coupled in series with the secondary power coil 1012 and each of the target coils 1014, 1016. However, the rotor circuitry 1102 of the inductive torque sensor system circuitry 1150 as shown in FIG. 11B includes a dedicated secondary power coil 1012 and a ternary power coil 1152. In this configuration, the secondary power coil 1012 is inductively coupled to the primary power coil 1006 and conductively coupled to the target coil 1014. An optional capacitor and/or other suitable circuitry may be coupled in series with the secondary power coil 1012 and the target coil 1014, similar to the inductive torque sensor system circuitry 1000 as shown in FIG. 11A. However, the ternary power coil 1152 is also inductively coupled to the primary power coil 1006 and conductively coupled to the target coil 1016, with another optional capacitor and/or other suitable circuitry being coupled in series with the ternary power coil 1152 and the target coil 1016. Again, the example of implementing two or three power coils, as well as the number of target coils, pickup coils systems, and pickup coils used in accordance with such pickup coil systems are provided by way of example and not limitation, and any suitable number and/or type of such components may be implemented in accordance with the various embodiments as described herein.

Regardless of the number and configuration of power coils, target coils, and pickup coils, embodiments include the stator circuitry 1104 and, in particular, the torque angle calculation circuitry 1106 being configured to calculate a rotational position (i.e. angle phi1') of the target coil 1014 with respect to the pickup coil system 1008 by processing the signals induced in each of the pickup coils that comprise the pickup coil system 1008. Likewise, the torque angle calculation circuitry 1106 is configured to separately and independently calculate a rotational position (i.e. angle phi2') of the target coil 1016 with respect to the pickup coil system 1010 by processing the signals induced in each of the pickup coils that comprise the pickup coil system 1010.

In an embodiment, the torque angle calculation circuitry 1006 may be implemented via one or more interconnected components as further discussed below, which may form part of the same component such as an integrated circuit, components occupying the same PCB board, etc. Unless otherwise specified, the various components of the torque angle calculation circuitry 1006 may include one or more processors or other processing components to facilitate the functionality of the various embodiments as discussed herein. In an embodiment, the torque angle calculation circuitry 1106 is configured to use the calculated angles phi1' and phi2' to calculate a torsion angle (delta'), and may optionally calculate the rotational position of the rotatable input shaft 1002 (phimech'). To do so, the torque angle calculation circuitry 1106 includes an oscillator 1106, which may be implemented as any suitable type of oscillator circuitry to provide an AC signal that is coupled to the primary coil 1006 via one or more wires, traces, etc., to provide the primary power coil 1006 with an AC current at any suitable frequency or range of frequencies (e.g. from 100 kHz to 10 MHz such as 3.5 MHz, for instance) and any suitable amplitude (e.g. 1V). As discussed above, the primary power coil 1006 is inductively coupled to the secondary power coil 1012 and, if present, to the ternary power coil 1152. In any event, the inductive coupling between the power coils 1006, 1012, and 1152 (if present), provides power to the target coils 1014, 1016 via the various coupling arrangements as discussed above and shown in FIGS. 10A-10B and 11A-11B. The pickup coils included in each of the pickup coil systems 1008, 1010 are also inductively coupled to the target coils 1014, 1016, respectively, and thus voltages are induced in each of the pickup coils included in the pickup coil systems 1008, 1010, which varies as the target coils 1014, 1016 rotate with respect to one another by the torsion angle delta when torque is transmitted from the rotatable input shaft 1002 to the rotatable output shaft 1004.

The voltages induced into the coils that form each of the pickup coil systems 1008, 1010 provide amplitude modulated voltage signals, with one signal being output by each respective coil in the pickup coil system (e.g. one per each sine and cosine coil for a two-phase system). These amplitude-modulated voltage signals are coupled to signal processing (SP) circuitry 1106B and 1106B' as shown in FIGS. 11A-11B. Although the torque angle calculation circuitry 1106 indicates a single line coupled to the SP circuitry block in FIGS. 11A-11B, this is for ease of explanation, as each SP circuitry 1106B and 1106B' receives a separate amplitude-modulated voltage signal from the terminals associated with each pickup coil that forms each respectively coupled pickup coil system 1008, 1010. Thus, the SP circuitry 1106B receives two or more amplitude-modulated voltage signals, one from each of the pickup coils in the pickup coil system 1008 (which are rotated with respect to one another), and the SP circuitry 1106B' likewise receives two or more amplitude-modulated voltage signals, one from each of the pickup coils in the pickup coil system 1010 (which are also rotated with respect to one another). These signals have an amplitude that varies with respect to the rotational position of the target coils 1014, 1016, as discussed herein.

The signal processing circuitry 1106B, 1106B' then processes the amplitude-modulated voltage signals provided by each separate pickup coil system 1008, 1010, respectively, to provide signal conditioning and/or corrective actions such as offset cancellations, amplitude normalization, etc. The signals output from the signal processing circuitry 1106B, 1106B' may be referred to herein as processed amplitude-modulated voltage signals. To perform this signal processing, the SP circuits 1106B, 1106B' may include any suitable type of circuitry for this purpose. For example, the SP circuits 1106B, 1106B' may be implemented to include EMC-filters, amplitude demodulators, amplifiers, ADCs, etc.

As noted above with reference to FIG. 8, the rotational position of the target coils 1014, 1016 may be represented as phi1' and phi2'. In an embodiment, the torque angle calculation circuitry 1106 includes target coil rotational displacement calculation circuitry 1106C, 1106C'. The target coil rotational displacement calculation circuitry 1106C, 1106C' are configured to separately and independently calculate the angles phi1' and phi2' of the target coils 1014, 1016 with respect to each respectively-coupled pickup coil system 1008, 1010. This calculation may be performed in any suitable manner, including known techniques and/or the techniques discussed above with respect to the various inductive angle sensor system using the processed amplitude-modulated voltage signals output by the SP circuitry 1106B, 1106B'.

However, because the inductive angle sensors described above (e.g. as shown in FIG. 8) include target coils that do not rotate with respect to one another, as is the case with the inductive torque sensor system described herein, the torque angle calculation circuitry 1106 includes combining circuitry 1106D, which may calculate the torsion angle delta' and optionally, the rotational angle phimech' using the angles phi1' and phi2'. To do so, embodiments include the combining circuitry 1106D being implemented with any suitable type of processor circuitry to combine the calculated angles phi1' and phi2' to derive the torsion angle delta' (primed quantities are derived from the sensor system, whereas unprimed ones are the real physical quantities).

Figure 12A:
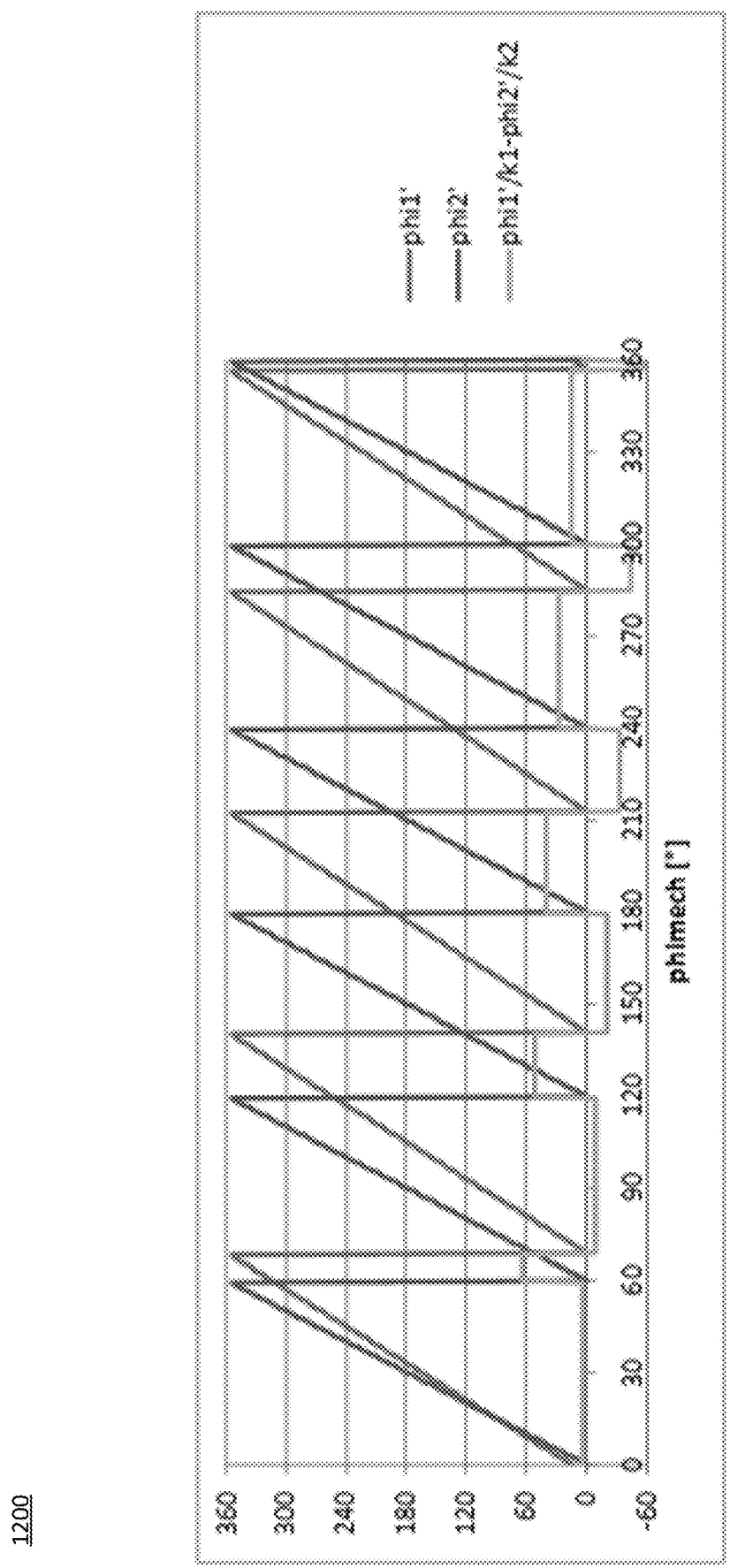
FIGS. 12A-12D illustrate measurements used to calculate the torsion angle, in accordance with one or more embodiments of the disclosure.
Figure 12B:
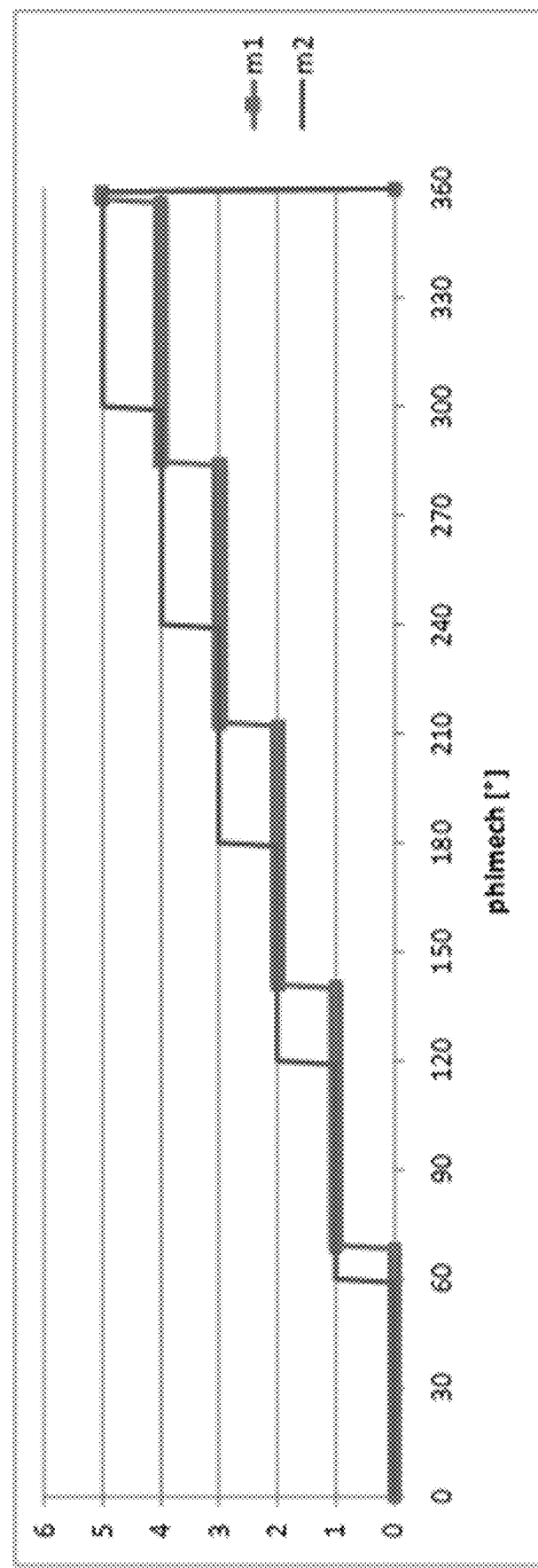
Figure 12C:
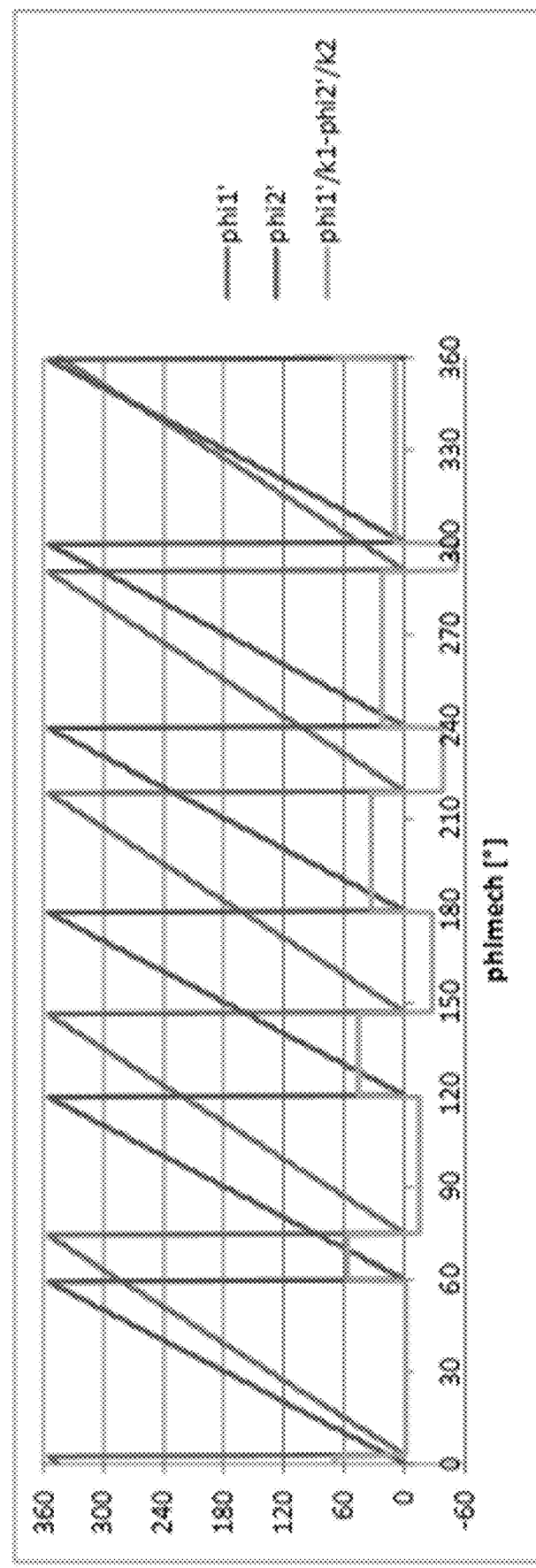
Figure 12D:
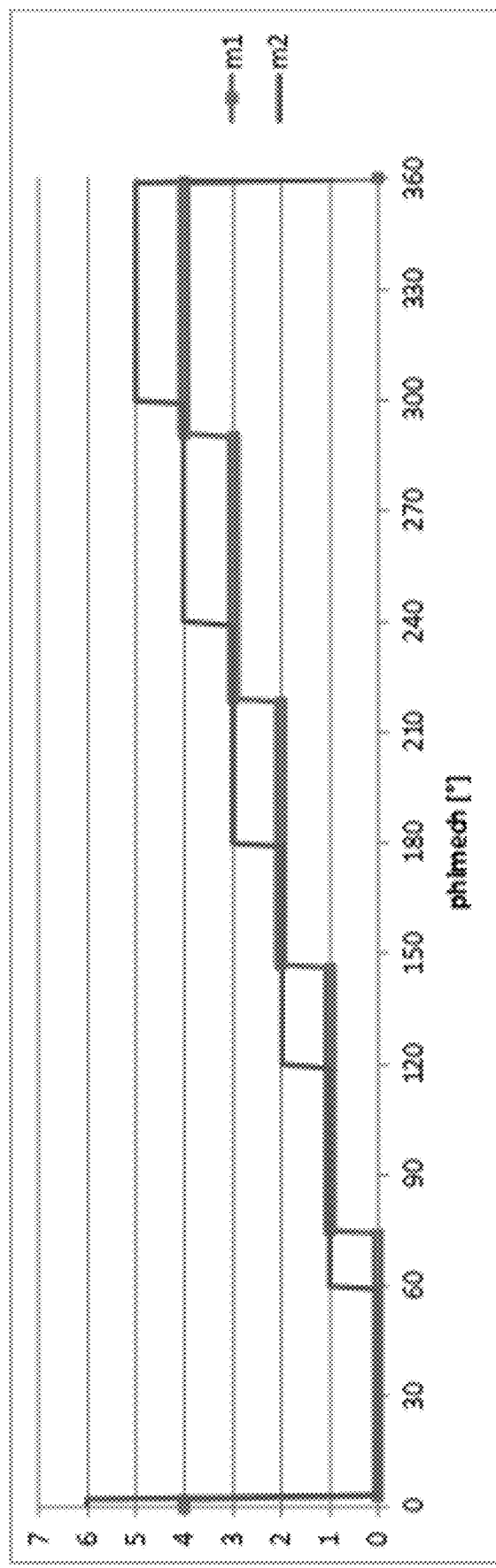

An example of this derivation is shown using the graphs in FIGS. 12A-12B for an inductive torque sensor system in which k1=5, k2=6, and the torsion angle delta is 3°. The graphs in FIGS. 12C-12D represent another example in which k1=5, k2=6, and the torsion angle delta is −3°. The graphs in FIGS. 12A and 12C show the various rotational positions of the rotatable input shaft 1002 (phimech') versus the various rotational positions of the angles phi1' and phi2' of the target coils 1014, 1016.

In an embodiment, the combining circuitry 1106D is configured to compute the torsion angle delta' from the various rotational positions of the angles phi1' and phi2' of the target coils 1014, 1016 using the following equation:

$$\text{delta}' = phi1'/k1 - phi2'/k2 + 360° \ast (m1/k1 - m2/k2), \quad \text{Eqn. 3:}$$

where m1 and m2 are integer values that range from m1=0,1, ... k1−1 and m2=0, 1, ... k2. The values of m1, m2 are chosen such that the resulting solution for the torsion angle delta' has the smallest absolute value. In other words, because of the different k-fold periodicities in the pickup coil systems 1008, 1010, there are multiple solutions that exist for the torsion angle delta' using Equation 3 above for different rotational positions of the target coils phi1', phi2'. The term 360°*(m1/k1−m2/k2) addresses the ambiguity of these multiple solutions by using the integer values m1, m2, which are initially unknown values but may be identified by iteratively computing solutions for the torsion angle delta' using the unique set of m1 and m2 values in accordance with the defined ranges noted above that yield the smallest absolute value for delta' in accordance with Equation 3. This smallest absolute value of the torsion angle delta' is thus identified as the measured torsion angle associated with the inductive torque sensor system. Optionally, the angle of the rotatable input shaft 1002 (phimech') may likewise be calculated. The graphs in FIGS. 12B and 12D show an example of the result of the calculation of the m1 and m2 values for the different torque angle deltas of 3° and −3°, respectively, which illustrates the relationship between the angle of the rotatable input shaft 1002 (phimech') and the selected m1 and m2 values.

Again, multiple solutions exist for the torsion angle delta' in accordance with the Equation 3 above, and the number of m1 and m2 values, and thus the number of iterations required to identify the unique solution, increases as the k-fold periodicities k1, k2 of the pickup coil systems 1008, 1010 also increase. Therefore, embodiments include an alternative to computing all combinations m1, m2. In accordance with such embodiments, the torque angle calculation circuitry 1106 may include a lookup table (LUT) 1106G or equivalent correction measures (e.g. algorithms or functional relationships with coefficients stored in an on-board memory) to improve the angle accuracy of the system, which is accessed by the combining circuitry 1106D to first determine the m1 and m2 values, and then calculate the torsion angle delta' (and optionally also the angle phimech' of the rotatable input shaft 1002). The LUT data shown in FIG. 13 may be calculated and stored, for example, using experimental or calibration data from a set of measurements associated with operation of inductive torque sensor system (e.g. as shown in FIGS. 10A-10B and 11A-11B). This LUT may be stored in any suitable type of memory that may be integrated as part of the combining block circuitry 1106D or as a separate component that is accessed via the combing circuitry 1106D.

In any event, the LUT 1106G may include a set of data that correlates the m1 and m2 values in the 3rd column, which represents the term 360°*(m1/k1−m2/k2) from Equation 3 above (represented in alternative form of (m1*360/k1−m2*360/k2) in FIG. 13). In other words, the table shown in FIG. 13 provides a set of predetermined integer values that correlate the term 360°*(m1/k1−m2/k2) to specific combinations of different integer values within the range of (0≤m1≤k1−1) and (0≤m2≤k2). Thus, the torsion angle delta' may be identified by evaluating, in accordance with Equation 3 above, the torsion angle delta' solution having the smallest absolute value for delta' in accordance with the term 360°*(m1/k1−m2/k2) being added to the first term phi1'/k1−phi2'/k2. An example of the contents of such a LUT is shown in FIG. 13 in ascending order. The embodiments in which the LUT table or suitable correction measures may be particularly useful, for instance, when the k1, k2 periodicities are large and/or when it is desirable to reduce processing resources and/or increase the speed in which the torsion angle delta' is calculated.

Additional details regarding the use of yet another algorithm, which uses a separate set of calculations than those described above to calculate the torsion angle is provided in the Appendix at the end of this disclosure. However, the overall concept, which is described in further detail in the Appendix, differs from the embodiments described above in which Equation 3 is implemented in that the algorithm shown and described in the Appendix need not explicitly compute the rotational positions phi1' and phi2' of the target coils 1008, 1010. Instead, the algorithm described in the Appendix may still utilize the signals output by each coil within the pickup coil systems 1008, 1010, which are provided to the respective SP circuitry 1106B, 1106B' as noted above with reference to FIGS. 11A-11B. However, in accordance with embodiments in which the Appendix algorithm is implemented, the target coil rotational displacement calculation circuitry 1106C, 1106C' may be omitted, and the SP circuitry 1106B, 1106B (and/or the combining block circuitry 1106D) may compute the combinations of demodulated and normalized signals a−c, b+d, a+c, b−d, apply an arctangent function on pairs of these signals to derive intermediate values A, B, compute weighted sums of A,B according to Appendix Eqn. 14(a,b), and compute the torsion angle using the rightmost N bits in accordance with a digital processing technique.

In other words, and with continued reference to the Appendix algorithm, the algorithm starts with signals a', b' that are derived from induced signals in pickup coils within the pickup coil system 1008 having k1-fold periodicity, and signals c', d' that are derived from induced signals in pickup within the pickup coil system 1010 having k2-fold periodicity. The algorithm then normalizes these amplitudes (e.g. via SP circuitry 1106B, 1106B') to yield the quantities a, b, c, d. Next, the algorithm combines a−c, b+d, a+c, and b−d. The algorithm then computes arctangents from pairs of these quantities, which yields the intermediate quantities A, B. The intermediate quantities A, B are then linearly combined with coefficients (m1, m2) that are fixed (i.e. predetermined or accessed via a memory) depending on k1, k2 and subtracts from this combination a term that shifts the result into a primitive interval of allowed torsion angles. Thus, once the combination of m1 and m2 values is identified that corresponds to the interval of allowed torsion angles, the torsion angle delta' is identified from the resulting shifted combination by separation of lower and higher portions of these binary representations to derive the torsion angle delta and the coefficient m2, as shown in Eqn. (14a).

The various processing steps performed in accordance with the embodiments herein may be performed by any suitable processing component, hardware components, software components, or combinations of these. Moreover, the processing steps of the various algorithms may be performed by any suitable portion and/or component(s) of the torque angle calculation circuitry 1106, as shown and described herein with reference to FIGS. 11A-11B.

The torsion angle delta', once determined, may provide for the calculation of the transmitted torque value based upon a correlation to the calculated torsion angle delta. Moreover, the blocks 1106E and 1106F may represent the calculated values for the torsion angle delta' and the optional calculation of the angle of the rotatable input shaft 1002 (phimech') depending upon the particular algorithm that is implemented for a specific application. Thus, the blocks 1106E and 1106F may characterize a digital representation of these values and/or represent these values stored in a suitable memory location that may be used to determine the torque values sensed by the inductive torque sensor system 1000 (e.g. as shown in FIGS. 10A-10B and 11A-11B).

EXAMPLES

The techniques of this disclosure may also be described in the following examples.

Example 1. A torque sensor, comprising: rotor circuitry including a first target coil and a second target coil, the first target coil and the second target coil each configured to be disposed coaxially about a torsion element and to rotate with respect to one another to form a torsion angle in response to rotation of the torsion element when torque is transmitted, the first target coil having a k-fold symmetry of a first periodicity, and the second target coil having a k-fold symmetry of a second periodicity that is different than the first periodicity; and stator circuitry including a first pickup coil system having at least two first pickup coils configured to be disposed coaxially about the torsion element, and a second pickup coil system having at least two second pickup coils configured to be disposed coaxially about the torsion element, the at least two first pickup coils having a k-fold symmetry matching the first periodicity, and the at least two second pickup coils having a k-fold symmetry matching the second periodicity, wherein the stator circuitry is configured to calculate the torsion angle based upon signals induced in the at least two first pickup coils via inductive coupling with the first target coil and based upon signals induced in the at least two second pickup coils via inductive coupling with the second target coil, and wherein each of the first target coil and the second target coil are astatic coils.

Example 2. The torque sensor of Example 1, wherein the stator circuitry is configured to calculate the torsion angle (delta') by: calculating a rotational position phi1' of the first target coil with respect to the first pickup coil system based upon the signals induced in the at least two first pickup coils; calculating a rotational position phi2' of the second target coil with respect to the second pickup coil system based upon the signals induced in the at least two second pickup coils; and iteratively evaluating the equation: delta'=(phi1'/k1)-(phi2'/k2)+(360°*(m1/k1-m2/k2)), for each of a combination of different integer values of (0≤m1≤k1-1) and (0≤m2≤k2) to identify the torsion angle delta' using the set of integer values m1, m2 that yield the smallest absolute value for delta', wherein k1 represents the k-fold symmetry of the first target coil having a first periodicity, and wherein k2 represents the k-fold symmetry of the second target coil having a second periodicity.

Example 3. The torque sensor of any combination of Examples 1-2, wherein the stator circuitry is configured to calculate the torsion angle (delta') by: calculating a rotational position phi1' of the first target coil with respect to the first pickup coil system based upon the signals induced in the at least two first pickup coils; calculating a rotational position phi2' of the second target coil with respect to the second pickup coil system based upon the signals induced in the at least two second pickup coils; and evaluating the equation: delta'=(phi1'/k1)-(phi2'/k2)+(360°*(m1/k1-m2/k2)) using a set of predetermined integer values that correlate the term 360°*(m1/k1-m2/k2) to specific combinations of different integer values within a range of (0≤m1≤k1-1) and (0≤m2≤k2) to identify the torsion angle delta' as the solution with a combination of m1 and m2 values that yields the smallest absolute value for delta' in accordance with the term 360°*(m1/k1-m2/k2), wherein k1 represents the k-fold symmetry of the first target coil having a first periodicity, and wherein k2 represents the k-fold symmetry of the second target coil having a second periodicity.

Example 4. The torque sensor of any combination of Examples 1-3, wherein the first target coil and the second target coil have a mutual inductance between one another that is one-tenth or less than the self-inductance of the first target coil or the second target coil Example 5. The torque sensor of any combination of Examples 1-4, wherein: the stator circuitry further comprises a first power coil coupled to an oscillator, the oscillator being configured to supply an alternating current (AC) signal to the first power coil, the rotor circuitry further comprises a second power coil that is (i) inductively coupled to the first power coil, and (ii) conductively coupled to the first target coil, and the signals induced in the at least two first pickup coils and the at least two second pickup coils are based upon the AC signal supplied to the first power coil.

Example 6. The torque sensor of any combination of Examples 1-5, wherein the second power coil is configured to be coupled to the first target coil via a series capacitor.

Example 7. The torque sensor of any combination of Examples 1-6, wherein the second power coil is further conductively coupled to the second target coil, and wherein the rotator circuitry further comprises a third power coil that is (i) inductively coupled to the first power coil, and (ii) conductively coupled to the second target coil.

Example 8. The torque sensor of any combination of Examples 1-7, wherein the first target coil is conductively coupled to the second target coil via one or more flexible wires.

Example 9. The torque sensor of any combination of Examples 1-8, wherein the first target coil is conductively coupled to the second target coil via the torsion element.

Example 10. The torque sensor of any combination of Examples 1-9, wherein: the first target coil and the second target coil are each configured to be disposed on the same side of the stator circuitry, the first target coil is configured to be disposed closer to the stator circuitry than the second target coil, and the first periodicity of the first target coil is greater than the second periodicity of the second target coil.

Example 11. The torque sensor of any combination of Examples 1-10, wherein: each one of the at least two first pickup coils included in the first pickup coil system are rotationally offset from one another in a circumferential direction in accordance with the function $$\frac{1}{2N}\left(\frac{360°}{k1}\right)$$

for an even number N of coils in the first pickup system, and $$\frac{1}{N}\left(\frac{360°}{k1}\right)$$

for an odd number N of coils in the first pickup system, with k1 representing the first periodicity, and each one of the at least two second pickup coils included in the second pickup coil system are rotationally offset from one another in a circumferential direction in accordance with the function $$\frac{1}{2M}\left(\frac{360°}{k2}\right)$$

for an even number M of coils in the second pickup system, and $$\frac{1}{M}\left(\frac{360°}{k2}\right)$$

for an odd number M of coils in the second pickup system, with k2 representing the second periodicity.

Example 12. The torque sensor of any combination of Examples 1-11, wherein: the stator circuitry further comprises a first power coil, the rotor circuitry further comprises a second power coil, and the first power coil and the second power coil have a mutual inductance between one another that is constant with respect to (i) a rotation angle of the first power coil, (ii) a rotation angle of the second power coil, and the torsion angle.

Example 13. The torque sensor system of any combination of Examples 1-12, wherein the stator circuitry is configured to calculate the torsion angle (delta) by: performing amplitude demodulation and normalization of the signals induced in the at least two first pickup coils to provide a first set of signals a, b that are normalized to a predefined amplitude; performing amplitude demodulation and normalization of the signals induced in the at least two second pickup coils to provide a second set of signals c, d that are normalized to the predefined amplitude; calculating an intermediate quantity A using at least one of (i) arctan 2{b+d, a−c}, or (ii) arctan 2{a+c, d-b}; calculating an intermediate quantity B using at least one of (i) arctan 2{b+d, a+c}, or (ii) arctan 2{a−c, d-b}; calculating the torsion angle delta by iteratively evaluating the equation: delta=C1*A+C2*B+C3*m2, using different values for m2 until a solution for the torsion angle delta is identified that lies within a predetermined range of allowable torsion angles, wherein each of the coefficients C1, C2, and C3 are predetermined values dependent upon the k-fold symmetry of the first target coil and the k-fold symmetry of the second target coil.

Example 14. A torque sensor system, comprising: a rotatable input shaft; a rotatable output shaft coupled to the rotatable input shaft, the rotatable input shaft and the rotatable output shaft having a common rotation axis and forming a torsion angle between one another when torque is transmitted in response to rotation of the rotatable input shaft; a first target coil coupled to one of the rotatable input shaft or the rotatable output shaft and being disposed coaxially about the common rotation axis, the first target coil being astatic and having a k-fold symmetry of a first periodicity; a second target coil coupled to other one of the rotatable input shaft and rotatable output shaft and being disposed coaxially about the common rotation axis, the second target coil being astatic and having a k-fold symmetry of a second periodicity that is different than the first periodicity; a first pickup coil system having at least two first pickup coils disposed coaxially about the common rotation axis, the at least two first pickup coils each being astatic and having a k-fold symmetry matching the first periodicity; a second pickup coil system having at least two second pickup coils configured to be disposed coaxially about the common rotation axis, the at least two second pickup coils each being astatic and having a k-fold symmetry matching the second periodicity; and stator circuitry configured to calculate the torsion angle based upon signals induced in the at least two first pickup coils via inductive coupling with the first target coil and based upon signals induced in the at least two second pickup coils via inductive coupling with the second target coil.

Example 15. The torque sensor system of Example 14, further comprising: a first power coil coupled to an oscillator, the oscillator being configured to supply an alternating current (AC) signal to the first power coil; and a second power coil that is (i) inductively coupled to the first power coil, and (ii) conductively coupled to the first target coil via a series capacitor, wherein the signals induced in the at least two first pickup coils and the at least two second pickup coils are based upon the AC signal supplied to the first power coil.

Example 16. The torque sensor system of any combination of Examples 14-15, wherein the second power coil is further conductively coupled to the second target coil, and further comprising: a third power coil that is (i) inductively coupled to the first power coil, and (ii) conductively coupled to the second target coil.

Example 17. The torque sensor system of any combination of Examples 14-16, wherein the first target coil is conductively coupled to the second target coil via one or more flexible wires.

Example 18. The torque sensor system of any combination of Examples 14-17, wherein the first target coil is conductively coupled to the second target coil via the rotatable output shaft.

Example 19. The torque sensor system of any combination of Examples 14-18, further comprising: a first power coil coupled to an oscillator, the oscillator being configured to supply an alternating current (AC) signal to the first power coil, and wherein: the first target coil and the second target coil are each configured to be disposed on the same side of the first power coil, the first target coil is configured to be disposed closer to the first power coil than the second target coil, and the first periodicity of the first target coil is greater than the second periodicity of the second target coil.

Example 20. The torque sensor system of any combination of Examples 14-19, wherein: each one of the at least two first pickup coils included in the first pickup coil system are rotationally offset from one another in a circumferential direction in accordance with the function $$\frac{1}{2N}\left(\frac{360°}{k1}\right)$$

for an even number N of coils in the first pickup system, and $$\frac{1}{N}\left(\frac{360°}{k1}\right)$$

for an odd number N of coils in the first pickup system, with k1 representing the first periodicity, and each one of the at least two second pickup coils included in the second pickup coil system are rotationally offset from one another in a circumferential direction in accordance with the function $$\frac{1}{2M}\left(\frac{360°}{k2}\right)$$

for an even number M of coils in the second pickup system, and $$\frac{1}{M}\left(\frac{360°}{k2}\right)$$

for an odd number M of coils in the second pickup system, with k2 representing the second periodicity.

Example 21. The torque sensor system of any combination of Examples 14-20, wherein the stator circuitry further comprises a first power coil, and further comprising: rotor circuitry comprising a second power coil, the first power coil and the second power coil having a mutual inductance between one another that is constant with respect to (i) a rotation angle of the first power coil, (ii) a rotation angle of the second power coil, and the torsion angle.

Example 22. The torque sensor system of any combination of Examples 14-21, wherein the stator circuitry is configured to calculate the torsion angle (delta') by: calculating a rotational position phi1' of the first target coil with respect to the first pickup coil system based upon the signals induced in the at least two first pickup coils; calculating a rotational position phi2' of the second target coil with respect to the second pickup coil system based upon the signals induced in the at least two second pickup coils; and iteratively evaluating the equation: delta'=(phi1'/k1)−(phi2'/k2)+(360°*(m1/k1−m2/k2)), for each of a combination of different integer values of (0≤m1≤k1−1) and (0≤m2≤k2) to identify the torsion angle delta' using the set of integer values m1, m2 that yield the smallest absolute value for delta', wherein k1 represents the k-fold symmetry of the first target coil having a first periodicity, and wherein k2 represents the k-fold symmetry of the second target coil having a second periodicity.

Example 23. The torque sensor system of any combination of Examples 14-22, wherein the stator circuitry is configured to calculate the torsion angle (delta') by: calculating a rotational position phi1' of the first target coil with respect to the first pickup coil system based upon the signals induced in the at least two first pickup coils; calculating a rotational position phi2' of the second target coil with respect to the second pickup coil system based upon the signals induced in the at least two second pickup coils; and evaluating the equation: delta'=(phi1'/k1)−(phi2'/k2)+(360°*(m1/k1−m2/k2)) using a set of predetermined integer values that correlate the term 360°*(m1/k1−m2/k2) to specific combinations of different integer values within a range of (0≤m1≤k1−1) and (0≤m2≤k2) to identify the torsion angle delta' as the solution with a combination of m1 and m2 values that yields the smallest absolute value for delta' in accordance with the term 360°*(m1/k1−m2/k2), wherein k1 represents the k-fold symmetry of the first target coil having a first periodicity, and wherein k2 represents the k-fold symmetry of the second target coil having a second periodicity.

Example 24. The torque sensor system of any combination of Examples 14-23, wherein the stator circuitry is configured to calculate the torsion angle (delta) by: performing amplitude demodulation and normalization of the signals induced in the at least two first pickup coils to provide a first set of signals a, b that are normalized to a predefined amplitude; performing amplitude demodulation and normalization of the signals induced in the at least two second pickup coils to provide a second set of signals c, d that are normalized to the predefined amplitude; calculating an intermediate quantity A using at least one of (i) arctan 2{b+d, a−c}, or (ii) arctan 2{a+c, d−b}; calculating an intermediate quantity B using at least one of (i) arctan 2{b+d, a+c}, or (ii) arctan 2{a−c, d−b}; calculating the torsion angle delta by iteratively evaluating the equation: delta=C1*A+C2*B+C3*m2, using different values for m2 until a solution for the torsion angle delta is identified that lies within a predetermined range of allowable torsion angles, wherein each of the coefficients C1, C2, and C3 are predetermined values dependent upon the k-fold symmetry of the first target coil and the k-fold symmetry of the second target coil.

CONCLUSION

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation data. The term "information" may in addition to any form of digital information also include other forms of representing information. The term "entity" or "unit" may in embodiments include any device, apparatus circuits, hardware, software, firmware, chips, or other semiconductors as well as logical units or physical implementations of protocol layers etc. Furthermore the terms "coupled" or "connected" may be interpreted in a broad sense not only covering direct but also indirect coupling.

It is further to be noted that methods disclosed in the specification or in the claims may be implemented by a device having means for performing each of the respective steps of these methods.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

APPENDIX

Algorithm for Retrieving the Torsion Angle from the Signals in the Pick-Up Coils Starting Point:

The algorithm discussed in this Appendix references coefficients m1 and m2. Although the m1 and m2 values described in this Appendix are also integers, these values are described separately and in a different context than the m1 and m2 values discussed in accordance with the algorithm above, which implements Equation 3 and requires the computation of the angles phi1' and phi2'. Again, the algorithm described in this Appendix need not calculate the rotational position of the target coils, but still utilizes the signals induced in the pickup coils within the pickup coil systems 1008, 1010 as shown and described above with reference to FIGS. 11A-11B.

The algorithm in this Appendix begins by assuming two target coils of k1- and k2-fold symmetry (e.g. target coils 1014, 1016), fixed on opposite ends of the torsion element 1003. We also have two pickup coil systems of k1- and k2-fold symmetry (pickup coil systems 1008, 1010). When torque is transmitted through the torsion element 1003 it twists the two target coils 1014, 1016 by an angle delta against each other, which we want to extract from the measured signal in the pickup coil systems 1008, 1010.

The first pickup coil system 1008 of k1-fold symmetry provides signals, which can be manipulated (e.g. by amplitude demodulation and optionally by some other arithmetic operations like sqrt(2)*(U−V) etc. . . . ) to give two signals a', b'.

$$a' = amp_1 \sin\left(k_1\left(\varphi + \frac{\delta}{2}\right)\right) \quad (1a)$$

$$b' = amp_1 \cos\left(k_1\left(\varphi + \frac{\delta}{2}\right)\right) \quad (1b)$$

where $\varphi$ is the average value of mechanical angles of the input and output shafts, and $\delta$ is the difference of mechanical angles of input and output shafts, i.e., the torsion angle. The second pickup coil system 1010 of $k_2$-fold symmetry provides signals c', d'.

$$c' = amp_2 \sin\left(k_2\left(\varphi - \frac{\delta}{2}\right)\right) \quad (2a)$$

$$d' = amp_2 \cos\left(k_2\left(\varphi - \frac{\delta}{2}\right)\right) \quad (2b)$$

Note that each pickup coil system can comprise two astatic coils (SIN+COS) or three non-coils (U,V,W), which need not be astatic. In the case of SIN+COS coils they directly provide sine and cosine signals like in (1a,b). In the case of U,V,W one can combine them to give sine and cosine signals like in (1a,b).

Normalization:

Note also that the signals (1a,b) might have a different amplitude than the signals (2a,b): $amp_1 \neq amp_2$. If the amplitudes differ too much this will give inaccuracies in $\delta$ calculation. In such cases, it might be necessary to normalize them to some predefined amplitude (e.g. to an amplitude of 1). The combining circuitry 1106D can do this by the following calculation in the digital domain:

$$a = \frac{a'}{\sqrt{(a')^2 + (b')^2}} = \sin\left(k_1\left(\varphi + \frac{\delta}{2}\right)\right) \quad (3a)$$

$$b = \frac{b'}{\sqrt{(a')^2 + (b')^2}} = \cos\left(k_1\left(\varphi + \frac{\delta}{2}\right)\right) \quad (3b)$$

$$c = \frac{c'}{\sqrt{(c')^2 + (d')^2}} = \sin\left(k_1\left(\varphi - \frac{\delta}{2}\right)\right) \quad (4a)$$

$$d = \frac{d'}{\sqrt{(c')^2 + (d')^2}} = \cos\left(k_1\left(\varphi - \frac{\delta}{2}\right)\right) \quad (4b)$$

Different amplitudes may be caused by different airgaps between the target coil 1014 to the pickup coil system 1008 and the target coil 1016 to the pickup coil system 1010 and/or by $k_1$ being different from $k_2$. Since the computation of the squares and square-roots needs a lot of electronic resources it is also an option, and is preferred, to have identical airgaps and to account for the different $k_1$, $k_2$ by a multiplication of the signals of the pickup coil system 1008, 1010 having the larger $k_1$, $k_2$ with a factor slightly larger than 1. The correct value can thus be found via a numerical simulation of the system or by experimental verification in the laboratory on prototypes.

Thus, it can be assumed that:

$$k_2 = k_1 + dk \quad (5)$$

All three numbers $k_1$, $k_2$, dk are positive integers. Next we introduce the average of $k_1$, $k_2$ as k.

$$k_1 = k - \frac{dk}{2} \quad (6a)$$

$$k_2 = k + \frac{dk}{2} \quad (6b)$$

Mathematical Transformation of Signals:

Inserting (6a,b) into (3a,b) and (4a,b) gives after applying some basic trigonometric formulas:

$$a = \sin\left(k\varphi - \frac{dk}{2}\frac{\delta}{2}\right)\cos\left(k\frac{\delta}{2} - \frac{dk}{2}\varphi\right) + \cos\left(k\varphi - \frac{dk}{2}\frac{\delta}{2}\right)\sin\left(k\frac{\delta}{2} - \frac{dk}{2}\varphi\right) \quad (7a)$$

$$b = \cos\left(k\varphi - \frac{dk}{2}\frac{\delta}{2}\right)\cos\left(k\frac{\delta}{2} - \frac{dk}{2}\varphi\right) - \sin\left(k\varphi - \frac{dk}{2}\frac{\delta}{2}\right)\sin\left(k\frac{\delta}{2} - \frac{dk}{2}\varphi\right) \quad (7b)$$

$$c = \sin\left(k\varphi - \frac{dk}{2}\frac{\delta}{2}\right)\cos\left(k\frac{\delta}{2} - \frac{dk}{2}\varphi\right) - \cos\left(k\varphi - \frac{dk}{2}\frac{\delta}{2}\right)\sin\left(k\frac{\delta}{2} - \frac{dk}{2}\varphi\right) \quad (8a)$$

$$d = \cos\left(k\varphi - \frac{dk}{2}\frac{\delta}{2}\right)\cos\left(k\frac{\delta}{2} - \frac{dk}{2}\varphi\right) + \sin\left(k\varphi - \frac{dk}{2}\frac{\delta}{2}\right)\sin\left(k\frac{\delta}{2} - \frac{dk}{2}\varphi\right) \quad (8b)$$

Combining these equations pair-wise gives:

$$a - c = 2\cos\left(k\varphi - \frac{dk}{2}\frac{\delta}{2}\right)\sin\left(k\frac{\delta}{2} - \frac{dk}{2}\varphi\right) \quad (9a)$$

$$b + d = 2\cos\left(k\varphi - \frac{dk}{2}\frac{\delta}{2}\right)\cos\left(k\frac{\delta}{2} - \frac{dk}{2}\varphi\right) \quad (9b)$$

$$a + c = 2\sin\left(k\varphi - \frac{dk}{2}\frac{\delta}{2}\right)\cos\left(k\frac{\delta}{2} - \frac{dk}{2}\varphi\right) \quad (9c)$$

$$d - b = 2\sin\left(k\varphi - \frac{dk}{2}\frac{\delta}{2}\right)\sin\left(k\frac{\delta}{2} - \frac{dk}{2}\varphi\right) \quad (9d)$$

From (9*a-d*) it follows:

IF $(b + d)^2 + (a - c)^2 \neq 0$ THEN (10a)

$$\arctan_2\{b + d, a - c\} = k\frac{\delta}{2} - \frac{dk}{2}\varphi + 2\pi m_1$$

IF $(a + c)^2 + (d - b)^2 \neq 0$ THEN (10b)

$$\arctan_2\{a + c, d - b\} = k\frac{\delta}{2} - \frac{dk}{2}\varphi + 2\pi m_1$$

whereby $m_1$ is a positive or negative integer number that shifts the result on the right-hand side of (10*a,b*) into the interval [0,360°). Note that by all circumstances exactly one of the IF-conditions in (10*a,b*) is fulfilled. It cannot happen that cosine and sine of $$k\varphi - \frac{dk}{2}\frac{\delta}{2}$$

equals zero. Thus means that with (10*a,b*) the combining circuitry 1106D can compute:

IF $(b + d)^2 + (a - c)^2 \neq 0$ THEN $A = \arctan_2\{b + d, a - c\}$ (11a)

ELSE $A = \arctan_2\{a + c, d - b\}$

Or alternatively the combining circuitry 1106D may compute:

IF $(b + d)^2 + (a - c)^2 > (a + c)^2 + (d - b)^2$ THEN (11a')

$A = \arctan_2\{b + d, a - c\}$

ELSE $A = \arctan_2\{a + c, d - b\}$ and it always holds that:

$$A = k\frac{\delta}{2} - \frac{dk}{2}\varphi + 2\pi m_1 \quad (11b)$$

Also from (9*a-d*) it follows that:

IF $(b + d)^2 + (a + c)^2 \neq 0$ THEN (12a)

$$\arctan_2\{b + d, a + c\} = k\varphi - \frac{dk}{2}\frac{\delta}{2} + 2\pi m_2$$

IF $(a - c)^2 + (d - b)^2 \neq 0$ THEN (12b)

$$\arctan_2\{a - c, d - b\} = k\varphi - \frac{dk}{2}\frac{\delta}{2} + 2\pi m_2$$

whereby m2 is a positive or negative integer number that shifts the result on the right-hand side of (12*a,b*) into the interval [0,360°). Note that by all circumstances exactly one of the IF-conditions in (12*a,b*) is fulfilled. It cannot happen that cosine and sine of $$k\frac{\delta}{2} - \frac{dk}{2}\varphi$$

equals zero. This means that with (12*a,b*) the combining circuitry 1106D may compute:

IF $(b + d)^2 + (a + c)^2 \neq 0$ THEN $B = \arctan_2\{b + d, a + c\}$ (13a)

ELSE $B = \arctan_2\{a - c, d - b\}$

Or alternatively, the combining circuitry 1106D may compute:

IF $(b+d)^2+(a+c)^2>(a-c)^2+(d-b)^2$ THEN $B=\arctan_2\{b+d,a+c\}$

ELSE $B=\arctan_2\{a-c,d-b\}$ (13a')

and it holds that:

$$B = k\varphi - \frac{dk}{2}\frac{\delta}{2} + 2\pi m_2 \quad (13b)$$

Suppose that the target coils 1014, 1016 have 5- and 6-fold symmetry. Then k=5.5 and dk=1. As the angle φ can vary between 0° and 360°, kφ in (13b) can go far beyond 3600 and it needs some negative integer value for m2 to bring B back into the primitive interval [0°,360°). The situation in (11b) is better, because dkφ/2 varies only between 0° and 180°. The torsion angle δ may vary between −9° and +9° in a typical application. Thus, kδ/2 varies between −25° and +25°. Finally, kδ/2+dkφ/2 varies between −205° and +25°, which is a span of 230°.

Thus $m_1$ can only be 0 or 1, if our arctan 2-function outputs only values in the range [0°,360°).

Of course it is also possible to define an arctan$_2$-function, which outputs only values in the range [−270°,90°). This may be performed by taking the original arctan$_2$-function with an output range [0°,360°) and subtracting 270° from its result. With such a new arctan$_2$-function, we can set $m_1$=0, and this greatly facilitates the solution of our problem. Then we have to find $m_2$ such that the right-hand side of (13b) also lies in the interval [−270°,90°).

Solving the linear system of equations (11b), (13b) for δ and φ yields:

$$\delta = \frac{8k}{4k^2 - dk^2}A + \frac{4dk}{4k^2 - dk^2}B - \frac{360° \times 4dk}{4k^2 - dk^2}m_2 \quad (14a)$$

$$\varphi = \frac{2dk}{4k^2 - dk^2}A + \frac{4k}{4k^2 - dk^2}B - \frac{360° \times 4k}{4k^2 - dk^2}m_2 \quad (14b)$$

The fractions in front of A, B, and $m_2$ are constants if the $k_1$, $k_2$ fold symmetries are fixed. They can be stored as simple coefficients in the memory of the combining circuitry 1106D or another suitable memory accessible by the combining circuitry 1106D. Thus, (14a,b) are simple multiplications and additions. Thus, the linear combination as shown in Equation 14a may be alternatively represented as C1*A+C2*B+C3*m2, with C1, C2, and C3 representing the fractions in Equation 14a. Likewise, the linear combination as shown in Equation 14b may be alternatively represented as D1*A+D2*B+D3*m2, with D1, D2, and D3 representing the fractions in Equation 14b.

Finally the combining circuitry 1106D only has to try out several values for $m_2$ in (14a) so that δ lies within [−9°, +9°]. Once it has found an appropriate value for $m_2$, it can insert it into (14b) and compute φ.

This 'try out $m_2$' algorithm is detailed below.

The step size in (14a) is $$\frac{360° \times 4dk}{4k^2 - dk^2}$$

which is 12° for k1=5, k2=6. This would NOT work for the range of [−9°, +9°] for δ. Suppose that the torsion angle is 8°. The system would compute (14a) starting with $m_2$=0. Suppose this already gives the result 8°. Next, the system would try out $m_2$=−1. This would give even smaller magnitude, because 8°−12°=−4° has even smaller magnitude. Thus, it would give the result of −4° torsion angle, which is wrong, because we said that the torsion angle was 8°.

For a range of torsion angles from −9° to +9° we should choose k1=4 and k2=5. Then, the step size in (14a) becomes 18°. Therefore, the system finds exactly ONE value within [−9°,+9°] when it steps across the zero crossing for δ.

This means that the step size in (14a) has to be equal or larger than the span of possible torsion angles.

'Try Out $m_2$' Algorithm:

The system does the computation (14a) in the digital domain. Here, the digital design engineer has to decide how many bits are needed for the representation of the torsion angle. To this end, we define that 1 LSB should correspond to an angle of $$\frac{360° \times 4dk}{4k^2 - dk^2} \times \frac{1}{2^N}$$

where N is a natural number.

In other words, the binary number $1000\ldots000_{bin}$ (with N zeros) means an angle of $$\frac{360° \times 4dk}{4k^2 - dk^2}$$

Now let us suppose the system uses M+N bits to represent $$\frac{8k}{4k^2 - dk^2}A + \frac{4dk}{4k^2 - dk^2}B$$

in (14a), where M is some natural number. Let us consider a few cases, where the combining circuitry 1106D computes $$\frac{8k}{4k^2 - dk^2}A + \frac{4dk}{4k^2 - dk^2}B$$

in binary representation and outputs the value for $m_2$ such that (14a) lies within the primitive interval $$\left[0, \frac{360° \times 4dk}{4k^2 - dk^2}\right]:$$

$$\frac{8k}{4k^2 - dk^2}A + \frac{4dk}{4k^2 - dk^2}B = \tag{15a}$$

$$\underbrace{0 \ldots 00}_{M} \underbrace{\ldots 01}_{N}{}_{bin} = \frac{360° \times 4dk}{4k^2 - dk^2} \times \frac{1}{2^N} \Rightarrow m_2 = 0$$

$$\frac{8k}{4k^2 - dk^2}A + \frac{4dk}{4k^2 - dk^2}B = \tag{15b}$$

$$\underbrace{0 \ldots 00}_{M} \underbrace{\ldots 011}_{N}{}_{bin} = \frac{360° \times 4dk}{4k^2 - dk^2} \times \frac{3}{2^N} \Rightarrow m_2 = 0$$

$$\frac{8k}{4k^2 - dk^2}A + \frac{4dk}{4k^2 - dk^2}B = \tag{15c}$$

$$\underbrace{0 \ldots 010}_{M} \underbrace{\ldots 011}_{N}{}_{bin} = \frac{360° \times 4dk}{4k^2 - dk^2} \times \left(1 + \frac{3}{2^N}\right) \Rightarrow m_2 = 1$$

$$\frac{8k}{4k^2 - dk^2}A + \frac{4dk}{4k^2 - dk^2}B = \tag{15d}$$

$$\underbrace{0 \ldots 01010}_{M} \underbrace{\ldots 011}_{N}{}_{bin} = \frac{360° \times 4dk}{4k^2 - dk^2} \times \left(5 + \frac{3}{2^N}\right) \Rightarrow m_2 = 5$$

So we see that the binary representation of m2 is simply the leftmost M bits. In other words, the combining circuitry 1106D does not have to 'try out' various values for m2. Instead, it simply takes the leftmost M bits in the binary representation of $$\frac{8k}{4k^2 - dk^2}A + \frac{4dk}{4k^2 - dk^2}B$$

to have $(-1)*m_2$. And it simply takes the rightmost N bits to have the torsion angle without need to compute $m_2$ (in fact $m_2$ is only needed explicitly for (14b)).

It should be noted that this algorithm considers only positive twist angles. However, a digital design engineer may use known techniques to generalize the algorithm for positive and negative twist angles. The overall message is that when a digital system is designed in an intelligent manner, the process of 'trying out' can be done very efficiently and quickly using simple digital manipulations.

What is claimed is:

1. A torque sensor, comprising:
rotor circuitry including a first target coil and a second target coil, the first target coil and the second target coil each configured to be disposed coaxially about a torsion element and to rotate with respect to one another to form a torsion angle in response to rotation of the torsion element when torque is transmitted, the first target coil having a k-fold rotational symmetry of a first periodicity, and the second target coil having a k-fold rotational symmetry of a second periodicity that is different than the first periodicity; and stator circuitry including a first pickup coil system having two first pickup coils configured to be disposed coaxially about the torsion element, and a second pickup coil system having two second pickup coils configured to be disposed coaxially about the torsion element, the two first pickup coils having a k-fold rotational symmetry that is the same as the first periodicity, and the two second pickup coils having a k-fold rotational symmetry that is the same as the second periodicity,
wherein the stator circuitry is configured to calculate the torsion angle based upon signals induced in the two first pickup coils via inductive coupling with the first target coil and based upon signals induced in the two second pickup coils via inductive coupling with the second target coil,
wherein each of the first target coil and the second target coil are astatic coils, and wherein the k-fold rotational symmetry of the first periodicity being different than the k-fold rotational symmetry of the second periodicity reduces mutual coupling between the first target coil and the second target coil.

2. The torque sensor of claim 1, wherein the stator circuitry is configured to calculate the torsion angle (delta') by:
calculating a rotational position phi1' of the first target coil with respect to the first pickup coil system based upon the signals induced in the two first pickup coils;
calculating a rotational position phi2' of the second target coil with respect to the second pickup coil system based upon the signals induced in the two second pickup coils; and
iteratively evaluating the equation:

$$delta'=(phi1'/k1)-(phi2'/k2)+(360°*(m1/k1-m2/k2)),$$

for each of a combination of different integer values of (0≤m1≤k1−1) and (0≤m2≤k2) to identify the torsion angle delta' using the set of integer values m1, m2 that yield the smallest absolute value for delta',
wherein k1 represents the k-fold rotational symmetry of the first target coil having a first periodicity, and
wherein k2 represents the k-fold rotational symmetry of the second target coil having a second periodicity.

3. The torque sensor of claim 1, wherein the stator circuitry is configured to calculate the torsion angle (delta') by:
calculating a rotational position phi1' of the first target coil with respect to the first pickup coil system based upon the signals induced in the two first pickup coils;
calculating a rotational position phi2' of the second target coil with respect to the second pickup coil system based upon the signals induced in the two second pickup coils; and
evaluating the equation:

$$delta'=(phi1'/k1)-(phi2'/k2)+(360°*(m1/k1-m2/k2))$$

using a set of predetermined integer values that correlate the term 360°*(m1/k1−m2/k2) to specific combinations of different integer values within a range of (0≤m1≤k1−1) and (0≤m2≤k2) to identify the torsion angle delta' as the solution with a combination of m1 and m2 values that yields the smallest absolute value for delta' in accordance with the term 360°*(m1/k1−m2/k2),
wherein k1 represents the k-fold rotational symmetry of the first target coil having a first periodicity, and
wherein k2 represents the k-fold rotational symmetry of the second target coil having a second periodicity.

4. The torque sensor of claim 1, wherein the first target coil and the second target coil have a mutual inductance between one another that is one-tenth or less than the self inductance of the first target coil or the second target coil.

5. The torque sensor of claim 1, wherein:
the stator circuitry further comprises a first power coil coupled to an oscillator, the oscillator being configured to supply an alternating current (AC) signal to the first power coil,
the rotor circuitry further comprises a second power coil that is (i) inductively coupled to the first power coil, and (ii) conductively coupled to the first target coil, and
the signals induced in the two first pickup coils and the two second pickup coils are based upon the AC signal supplied to the first power coil.

6. The torque sensor of claim 5, wherein the second power coil is configured to be coupled to the first target coil via a series capacitor.

7. The torque sensor of claim 5, wherein the second power coil is further conductively coupled to the second target coil, and
wherein the rotor circuitry further comprises a third power coil that is (i) inductively coupled to the first power coil, and (ii) conductively coupled to the second target coil.

8. The torque sensor of claim 1, wherein the first target coil is conductively coupled to the second target coil via one or more flexible wires.

9. The torque sensor of claim 1, wherein the first target coil is conductively coupled to the second target coil via the torsion element.

10. The torque sensor of claim 1, wherein: the first target coil and the second target coil are each configured to be disposed on the same side of the stator circuitry, the first target coil is configured to be disposed closer to the stator circuitry than the second target coil, and the first periodicity of the first target coil is greater than the second periodicity of the second target coil.

11. The torque sensor of claim 1, wherein:
each one of the two first pickup coils included in the first pickup coil system are rotationally offset from one another in a circumferential direction in accordance with the function $$\frac{1}{2N}\left(\frac{360°}{k1}\right)$$

for an even number N of coils in the first pickup coil system, and $$\frac{1}{N}\left(\frac{360°}{k1}\right)$$

for and odd number N of coils in the first pickup coil system, with k1 representing the first periodicity, and
each one of the two second pickup coils included in the second pickup coil system are rotationally offset from one another in a circumferential direction in accordance with the function $$\frac{1}{2M}\left(\frac{360°}{k2}\right)$$

for an even number M of coils in the second pickup system, and $$\frac{1}{M}\left(\frac{360°}{k2}\right)$$

for and odd number M of coils in the second pickup system, with k2 representing the second periodicity.

12. The torque sensor of claim 1, wherein: the stator circuitry further comprises a first power coil, the rotor circuitry further comprises a second power coil, and the first power coil and the second power coil have a mutual inductance between one another that is constant with respect to (i) a rotation angle of the first power coil, (ii) a rotation angle of the second power coil, and (iii) the torsion angle.

13. The torque sensor of claim 1, wherein the stator circuitry is configured to calculate the torsion angle (delta) by:
  performing amplitude demodulation and normalization of the signals induced in the two first pickup coils to provide a first set of signals a, b that are normalized to a predefined amplitude;
  performing amplitude demodulation and normalization of the signals induced in the two second pickup coils to provide a second set of signals c, d that are normalized to the predefined amplitude;
  calculating an intermediate quantity A using at least one of (i) arctan 2{b+d, a−c}, or (ii) arctan 2{a+c, d−b};
  calculating an intermediate quantity B using at least one of (i) arctan 2{b+d, a+c}, or (ii) arctan 2{a−c, d−b}; and
  calculating the torsion angle delta by iteratively evaluating the equation:

delta=C1*A+C2*B+C3*m2, using different values for m2 until a solution for the torsion angle delta is identified that lies within a predetermined range of allowable torsion angles,
  wherein each of the coefficients C1, C2, and C3 are predetermined values dependent upon the k-fold rotational symmetry of the first target coil and the k-fold rotational symmetry of the second target coil.

14. A torque sensor system, comprising:
  a rotatable input shaft;
    a rotatable output shaft coupled to the rotatable input shaft, the rotatable input shaft and the rotatable output shaft having a common rotation axis and forming a torsion angle between one another when torque is transmitted in response to rotation of the rotatable input shaft;
    a first target coil coupled to one of the rotatable input shaft or the rotatable output shaft and being disposed coaxially about the common rotation axis, the first target coil being astatic and having a k-fold rotational symmetry of a first periodicity;
    a second target coil coupled to the other one of the rotatable input shaft and the rotatable output shaft and being disposed coaxially about the common rotation axis, the second target coil being astatic and having a k-fold rotational symmetry of a second periodicity that is different than the first periodicity;
    a first pickup coil system having two first pickup coils disposed coaxially about the common rotation axis, the two first pickup coils each being astatic and having a k-fold rotational symmetry that is the same as the first periodicity;
    a second pickup coil system having two second pickup coils configured to be disposed coaxially about the common rotation axis, the two second pickup coils each being astatic and having a k-fold rotational symmetry that is the same as the second periodicity; and
    stator circuitry configured to calculate the torsion angle based upon signals induced in the two first pickup coils via inductive coupling with the first target coil and based upon signals induced in the two second pickup coils via inductive coupling with the second target coil,
  wherein the k-fold rotational symmetry of the first periodicity being different than the k-fold rotational symmetry of the second periodicity reduces mutual coupling between the first target coil and the second target coil.

15. The torque sensor system of claim 14, further comprising:
  a first power coil coupled to an oscillator, the oscillator being configured to supply an alternating current (AC) signal to the first power coil; and
  a second power coil that is (i) inductively coupled to the first power coil, and (ii) conductively coupled to the first target coil via a series capacitor,
  wherein the signals induced in the two first pickup coils and the two second pickup coils are based upon the AC signal supplied to the first power coil.

16. The torque sensor system of claim 15, wherein the second power coil is further conductively coupled to the second target coil, and further comprising: a third power coil that is (i) inductively coupled to the first power coil, and (ii) conductively coupled to the second target coil.

17. The torque sensor system of claim 14, wherein the first target coil is conductively coupled to the second target coil via one or more flexible wires.

18. The torque sensor system of claim 14, wherein the first target coil is conductively coupled to the second target coil via the rotatable output shaft.

19. The torque sensor system of claim 14, further comprising: a first power coil coupled to an oscillator, the oscillator being configured to supply an alternating current (AC) signal to the first power coil, and wherein: the first target coil and the second target coil are each configured to be disposed on the same side of the first power coil, the first target coil is configured to be disposed closer to the first power coil than the second target coil, and the first periodicity of the first target coil is greater than the second periodicity of the second target coil.

20. The torque sensor system of claim 14, wherein:
  each one of the two first pickup coils included in the first pickup coil system are rotationally offset from one another in a circumferential direction in accordance with the function $$\frac{1}{2N}\left(\frac{360°}{k1}\right)$$

for an even number N of coils in the first pickup coil system, and $$\frac{1}{N}\left(\frac{360°}{k1}\right)$$

for and odd number N of coils in the first pickup coil system, with k1 representing the first periodicity, and each one of the two second pickup coils included in the second pickup coil system are rotationally offset from one another in a circumferential direction in accordance with the function $$\frac{1}{2M}\left(\frac{360°}{k2}\right)$$

for an even number M of coils in the second pickup coil system, and $$\frac{1}{M}\left(\frac{360°}{k2}\right)$$

for and odd number M of coils in the second pickup coil system, with k2 representing the second periodicity.

21. The torque sensor system of claim 14, wherein the stator circuitry further comprises a first power coil, and further comprising: rotor circuitry comprising a second power coil, the first power coil and the second power coil having a mutual inductance between one another that is constant with respect to (i) a rotation angle of the first power coil, (ii) a rotation angle of the second power coil, and (iii) the torsion angle.

22. The torque sensor system of claim 14, wherein the stator circuitry is configured to calculate the torsion angle (delta') by:

calculating a rotational position phi1' of the first target coil with respect to the first pickup coil system based upon the signals induced in the two first pickup coils;

calculating a rotational position phi2' of the second target coil with respect to the second pickup coil system based upon the signals induced in the two second pickup coils; and iteratively evaluating the equation:

delta'=(*phi1'/k1*)−(*phi2'/k2*)+(360°*(*m1/k1−m2/k2*)), for each of a combination of different integer values of (0≤m1≤k1−1) and (0≤m2≤k2) to identify the torsion angle delta' using the set of integer values m1, m2 that yield the smallest absolute value for delta', wherein k1 represents the k-fold rotational symmetry of the first target coil having a first periodicity, and wherein k2 represents the k-fold rotational symmetry of the second target coil having a second periodicity.

23. The torque sensor system of claim 14, wherein the stator circuitry is configured to calculate the torsion angle (delta') by:

calculating a rotational position phi1' of the first target coil with respect to the first pickup coil system based upon the signals induced in the two first pickup coils;

calculating a rotational position phi2' of the second target coil with respect to the second pickup coil system based upon the signals induced in the two second pickup coils; and evaluating the equation:

delta'=(*phi1'/k1*)−(*phi2'/k2*)+(360° *(*m1/k1−m2/k2*))

using a set of predetermined integer values that correlate the term 360°*(m1/k1−m2/k2) to specific combinations of different integer values within a range of (0≤m1≤k1−1) and (0≤m2≤k2) to identify the torsion angle delta' as the solution with a combination of m1 and m2 values that yields the smallest absolute value for delta' in accordance with the term 360° *(m1/k1−m2/k2), wherein k1 represents the k-fold rotational symmetry of the first target coil having a first periodicity, and wherein k2 represents the k-fold rotational symmetry of the second target coil having a second periodicity.

24. The torque sensor system of claim 14, wherein the stator circuitry is configured to calculate the torsion angle (delta) by:

performing amplitude demodulation and normalization of the signals induced in the two first pickup coils to provide a first set of signals a, b that are normalized to a predefined amplitude;

performing amplitude demodulation and normalization of the signals induced in the two second pickup coils to provide a second set of signals c, d that are normalized to the predefined amplitude;

calculating an intermediate quantity A using at least one of (i) arctan 2{b+d, a−c}, or (ii) arctan 2{a+c, d−b};

calculating an intermediate quantity B using at least one of (i) arctan 2{b+d, a+c}, or (ii) arctan 2{a−c, d−b};

calculating the torsion angle delta by iteratively evaluating the equation:

delta=*C1*A+C2*B+C3*m2*, using different values for m2 until a solution for the torsion angle delta is identified that lies within a predetermined range of allowable torsion angles, wherein each of the coefficients C1, C2, and C3 are predetermined values dependent upon the k-fold rotational symmetry of the first target coil and the k-fold rotational symmetry of the second target coil.

* * * * *